(12) United States Patent
Bao et al.

(10) Patent No.: US 11,001,695 B2
(45) Date of Patent: May 11, 2021

(54) FAST AND REVERSIBLE THERMORESPONSIVE POLYMER SWITCHING MATERIALS

(71) Applicant: The Board of Trustees of the Leland Stanford Junior University, Stanford, CA (US)

(72) Inventors: Zhenan Bao, Stanford, CA (US); Yi Cui, Stanford, CA (US); Zheng Chen, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/065,990

(22) PCT Filed: Jan. 9, 2017

(86) PCT No.: PCT/US2017/012744
§ 371 (c)(1),
(2) Date: Jun. 25, 2018

(87) PCT Pub. No.: WO2017/120594
PCT Pub. Date: Jul. 13, 2017

(65) Prior Publication Data
US 2019/0016871 A1    Jan. 17, 2019

Related U.S. Application Data

(60) Provisional application No. 62/276,032, filed on Jan. 7, 2016.

(51) Int. Cl.
*C08K 3/08* (2006.01)
*C08K 9/02* (2006.01)
(Continued)

(52) U.S. Cl.
CPC .............. *C08K 3/08* (2013.01); *C08K 3/042* (2017.05); *C08K 7/18* (2013.01); *C08K 9/02* (2013.01);
(Continued)

(58) Field of Classification Search
None
See application file for complete search history.

(56) References Cited

U.S. PATENT DOCUMENTS 5,554,679 A * 9/1996 Cheng ...................... C08K 3/04
524/440
8,808,890 B2    8/2014 Fuse
(Continued)

FOREIGN PATENT DOCUMENTS

CN        100423323 C    10/2008
CN        104425844 A    3/2015
(Continued)

OTHER PUBLICATIONS

Engineering Tool Box (2003) Coefficients of Linear Thermal Expansion, [online] Available at: https://www.engineeringtoolbox.com/linear-expansion-coefficients-d_95.html; PDF pp. 1-4, Wayback Machine Internet Archive capture on May 11, 2013. (Year: 2003).*
(Continued)

*Primary Examiner* — Katie L. Hammer
(74) *Attorney, Agent, or Firm* — Foley & Lardner LLP

(57) ABSTRACT

A polymer composite includes a polymeric matrix and conductive fillers dispersed in the polymeric matrix. The polymeric matrix includes a polymer having a thermal expansion coefficient of at least about 100 μm/(m K), and the conductive fillers have surface texturing.

22 Claims, 28 Drawing Sheets

(51) Int. Cl.

| | |
|---|---|
| *C08L 101/12* | (2006.01) |
| *H01M 4/66* | (2006.01) |
| *H01M 50/446* | (2021.01) |
| *C08K 3/04* | (2006.01) |
| *C08L 23/06* | (2006.01) |
| *C08L 27/16* | (2006.01) |
| *H01M 10/44* | (2006.01) |
| *H01M 10/60* | (2014.01) |
| *H01M 10/42* | (2006.01) |
| *C08K 7/18* | (2006.01) |

(52) U.S. Cl.
CPC ............... *C08L 23/06* (2013.01); *C08L 27/16* (2013.01); *C08L 101/12* (2013.01); *H01M 4/666* (2013.01); *H01M 4/667* (2013.01); *H01M 4/668* (2013.01); *H01M 10/4235* (2013.01); *H01M 10/443* (2013.01); *H01M 50/446* (2021.01); *C08K 2003/0862* (2013.01); *C08K 2201/001* (2013.01); *C08K 2201/005* (2013.01); *C08L 2207/066* (2013.01); *H01M 2200/106* (2013.01)

(56) References Cited

U.S. PATENT DOCUMENTS

| | | | |
|---|---|---|---|
| 2002/0093007 A1* | 7/2002 | Handa | H01C 7/027 252/500 |
| 2006/0083694 A1* | 4/2006 | Kodas | B01J 13/0043 424/46 |
| 2008/0025876 A1 | 1/2008 | Ramamurthy | |
| 2010/0020471 A1* | 1/2010 | Schneuwly | H01G 9/016 361/502 |
| 2010/0255353 A1* | 10/2010 | McDonald | H01B 1/122 429/62 |
| 2011/0181424 A1* | 7/2011 | Hu | H03K 17/94 340/584 |
| 2011/0274850 A1* | 11/2011 | Yang | C23C 26/02 427/453 |
| 2013/0256606 A1 | 10/2013 | Matsumoto et al. | |
| 2013/0344391 A1* | 12/2013 | Yushin | H01M 4/366 429/231.8 |
| 2015/0132568 A1 | 5/2015 | Wang | |
| 2016/0042878 A1 | 2/2016 | Kato et al. | |

FOREIGN PATENT DOCUMENTS

| | | |
|---|---|---|
| EP | 2 693 524 A1 | 2/2014 |
| JP | 2002-103058 A | 4/2002 |
| WO | WO-2014/157405 A1 | 10/2014 |

OTHER PUBLICATIONS

Stassi et al. ("Spiky Nanostructured Metal Particles as Filler of Polymeric Composites Showing Tunable Electrical Conductivity", Journal of Polymer Science Part B: Polymer Physics 2012, 50, pp. 984-992; a PDF copy was accessed from Wiley Online Library), (Year: 2012).*

"Polydimethylsiloxane (PDMS)" in the Table of Polymer Properties. Handbook of Polymers (2nd Edition). Retrieved on Aug. 22, 2020 from https://app.knovel.com/hotlink/itble/rcid:kpHPE00012/id:kt00XRG5D7/handbook-polymers-2nd-table-polymer-properties; copy of Table saved as a PDF, pp. 1-2. (Year: 2016).*

Bloor, D. et al. (2005) "A metal-polymer composite with unusual properties," J. Phys. D: Appl. Phys. 38:2851-2860.

Chen, Z. et al. (2016) "Characterization and Understanding of Thermoresponsive Polymer Composites Based on Spiky Nanostructured Fillers," Adv Electron Mater. 3(1):1600397.

Chen, Z. et al. (2016) "Fast and reversible thermoresponsive polymer switching materials for safer batteries," Nature Energy 1(15009):1-8.

Kim, J. et al. (2004) "Positive Temperature Coefficient Behavior of Polymer Composites Having a High Melting Temperature," J Appl Polym Sci. 92:394-401.

International Search Report and Written Opinion (ISA/KR) for International Application No. PCT/US2017/012744, dated Jun. 22, 2017.

\* cited by examiner

FAST AND REVERSIBLE THERMORESPONSIVE POLYMER SWITCHING MATERIALS

CROSS-REFERENCE TO RELATED APPLICATION

This application is a national stage entry under 35 U.S.C. § 371 of International Application No. PCT/US2017/012744, filed Jan. 9, 2017, which claims the benefit of U.S. Provisional Application No. 62/276,032, filed Jan. 7, 2016, the content of each of which is incorporated herein by reference in its entirety.

STATEMENT REGARDING FEDERALLY SPONSORED RESEARCH OR DEVELOPMENT

This invention was made with Government support under contract DE-ACO2-765F00515 awarded by the Department of Energy. The Government has certain rights in the invention.

BACKGROUND

Reliable and high-performance lithium-ion batteries (LIBs) are highly desirable for consumer electronics, electrical vehicles and grid energy storage, among other applications. Whereas the energy density, power density and cycling life of LIBs have been significantly improved in the past two decades, battery safety remains an important and unresolved issue. A high battery specific energy density generally increases the energetic response when the LIBs are subjected to abuse. Safety issues have become a major obstacle impeding the large-scale application of high-energy-density LIBs.

It is against this background that a need arose to develop embodiments of this disclosure.

SUMMARY

In some embodiments, a polymer composite includes a polymeric matrix and conductive fillers dispersed in the polymeric matrix. The polymeric matrix includes a polymer having a thermal expansion coefficient of at least about 100 $\mu$m/(m K), and the conductive fillers have surface texturing.

In some embodiments, the thermal expansion coefficient of the polymer is at least about 140 $\mu$m/(m K).

In some embodiments, the polymer is selected from polyolefins, polyethers, and fluoropolymers.

In some embodiments, the conductive fillers include metal microparticles having surface texturing.

In some embodiments, the metal microparticles each includes a core and protrusions extending from the core.

In some embodiments, the metal microparticles each includes a core, protrusions extending from the core, and a conductive coating at least partially covering the core and the protrusions.

In some embodiments, the conductive coating includes a carbonaceous material.

In some embodiments, the conductive coating includes graphene.

In some embodiments, the conductive coating has a thickness in a range from about 0.5 nm to about 100 nm.

In some embodiments, a loading level of the conductive fillers is in a range from about 0.5% to about 40% by volume of the polymer composite.

In some embodiments, the polymer composite is characterized by a switching temperature, such that an electrical conductivity of the polymer composite undergoes a change by a factor of at least about $10^3$ across the switching temperature.

In some embodiments, the electrical conductivity of the polymer composite undergoes a change by a factor of at least about $10^5$ across the switching temperature.

In some embodiments, a battery electrode structure includes a current collector and an electrode disposed adjacent to the current collector and including an electrochemically active material. The current collector includes the polymer composite as set forth in the foregoing.

In some embodiments, the current collector includes a metal layer and a layer of the polymer composite coated over the metal layer.

In some embodiments, a battery includes an anode structure, a cathode structure, and an electrolyte disposed between the anode structure and the cathode structure. At least one of the anode structure and the cathode structure corresponds to the battery electrode structure as set forth in the foregoing.

In some embodiments, a sensor includes a sensor body and a pair of electrical contacts electrically connected to the sensor body. The sensor body includes the polymer composite as set forth in the foregoing.

In some embodiments, a battery includes an anode, a cathode, an electrolyte disposed between the anode and the cathode, and a layer of a polymer composite electrically connected in series with the anode and the cathode. The polymer composite includes a polymeric matrix and conductive fillers dispersed in the polymeric matrix. The polymeric matrix includes a polymer having a thermal expansion coefficient of at least 100 $\mu$m/(m K), and the conductive fillers have surface texturing.

In some embodiments, the polymer is selected from polyolefins, polyethers, and fluoropolymers.

In some embodiments, the conductive fillers include metal microparticles each including a core, protrusions extending from the core, and a conductive coating at least partially covering the core and the protrusions.

In some embodiments, the conductive coating includes graphene.

In some embodiments, the polymer composite is characterized by a switching temperature, such that an electrical conductivity of the polymer composite undergoes a decrease by a factor of at least $10^3$ across the switching temperature, and the battery is deactivated when an operating temperature of the battery rises across the switching temperature, thereby mitigating against overheating of the battery.

In some embodiments, the polymer composite is highly responsive and is characterized by a fast response to a small temperature change.

In some embodiments, the polymer composite can be tuned to be most sensitive at a desired temperature range.

In some embodiments, the layer of the polymer composite can be disposed at the anode side, the cathode side, or both sides, and can be in direct contact or not in direct contact with the cathode or the anode.

In some embodiments, the battery further includes a current collector, and the layer of the polymer composite is disposed on the current collector, and can be in direct contact or not in direct contact with the electrolyte.

In some embodiments, the battery includes a battery case, and the layer of the polymer composite can be disposed inside of the battery case or outside of the battery case.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

This allows PP/GrNi-based TRPS to be operated at higher temperature (>about 100° C.) than PE/GrNi-based TRPS.

Figure 13:
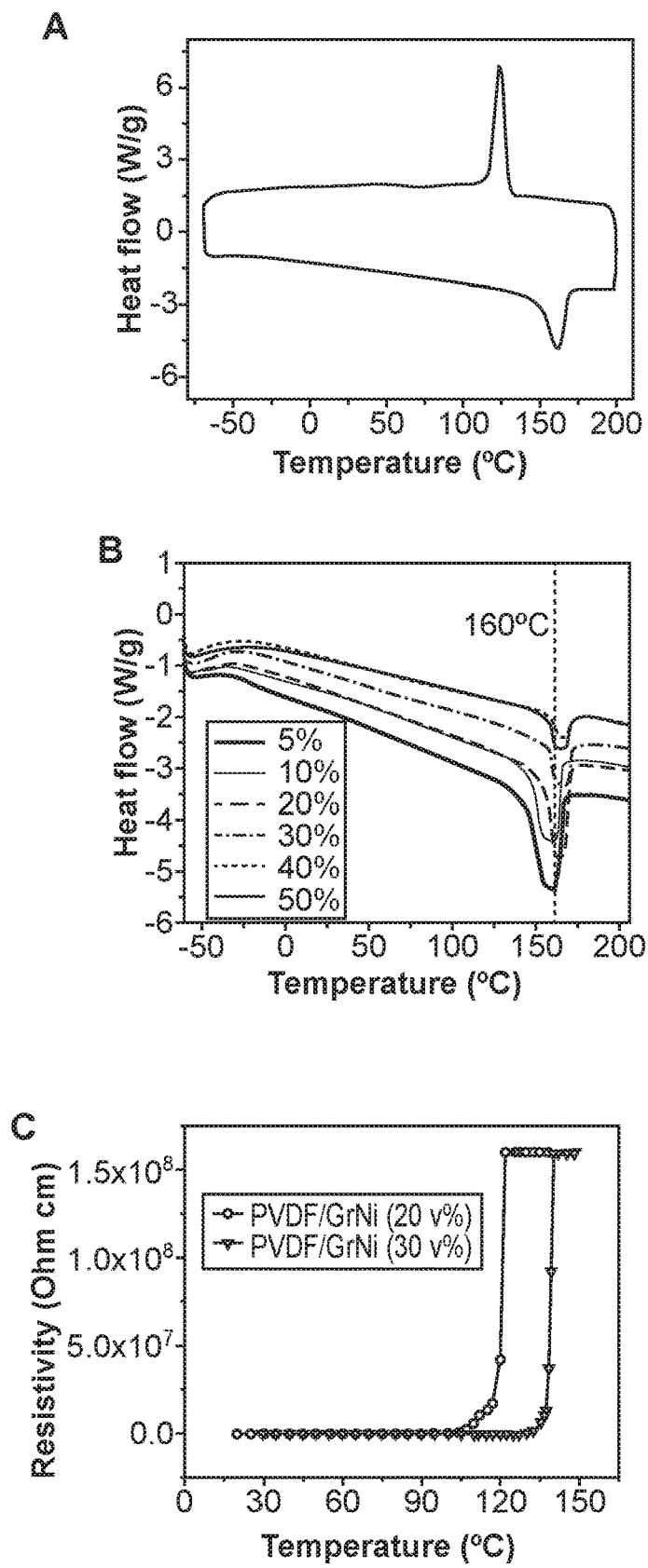

FIG. 13. DSC plots of pure PVDF (a) and PVDF/GrNi-based TRPS (b). All different samples have melting points at about 170° C. This allows PVDF/GrNi-based TRPS to be operated at further increased temperature (e.g., about 100-120° C. (c)).

Figure 14:
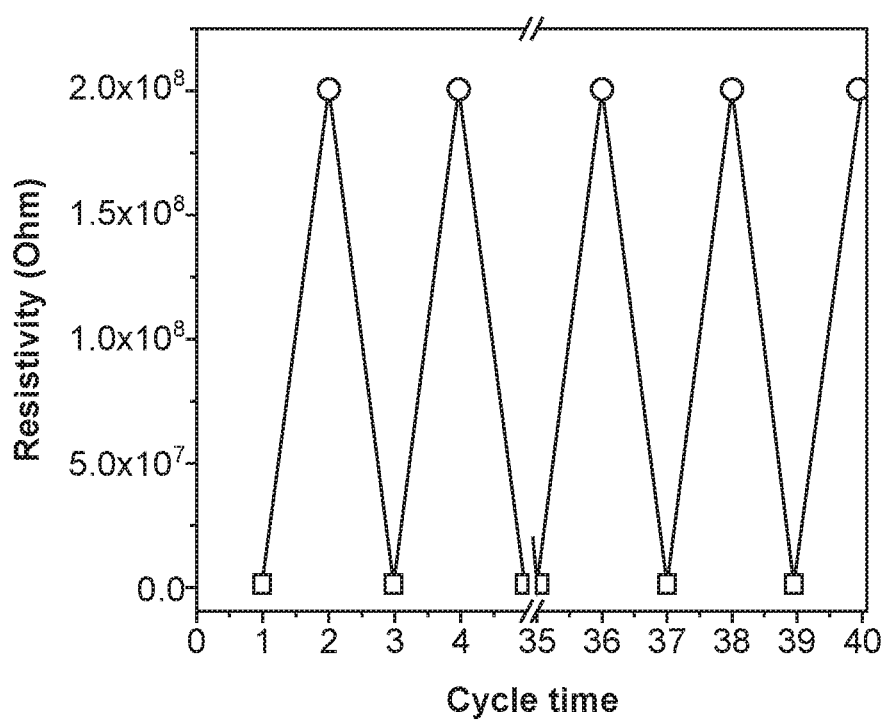

FIG. 14. Reversible thermal switching behavior of a TRPS (PE/GrNi, about 30 vol. % GrNi) film upon heating and cooling over 20 repeating cycles. The heating was performed by blowing hot air with a hot gun set at about 157° C. and about 2 cm away from the sample surface, which allowed the TRPS film to reach about 80° C. (measured by an infrared (IR) gun). The resistance of the film kept stable during repeating operation.

Figure 15:
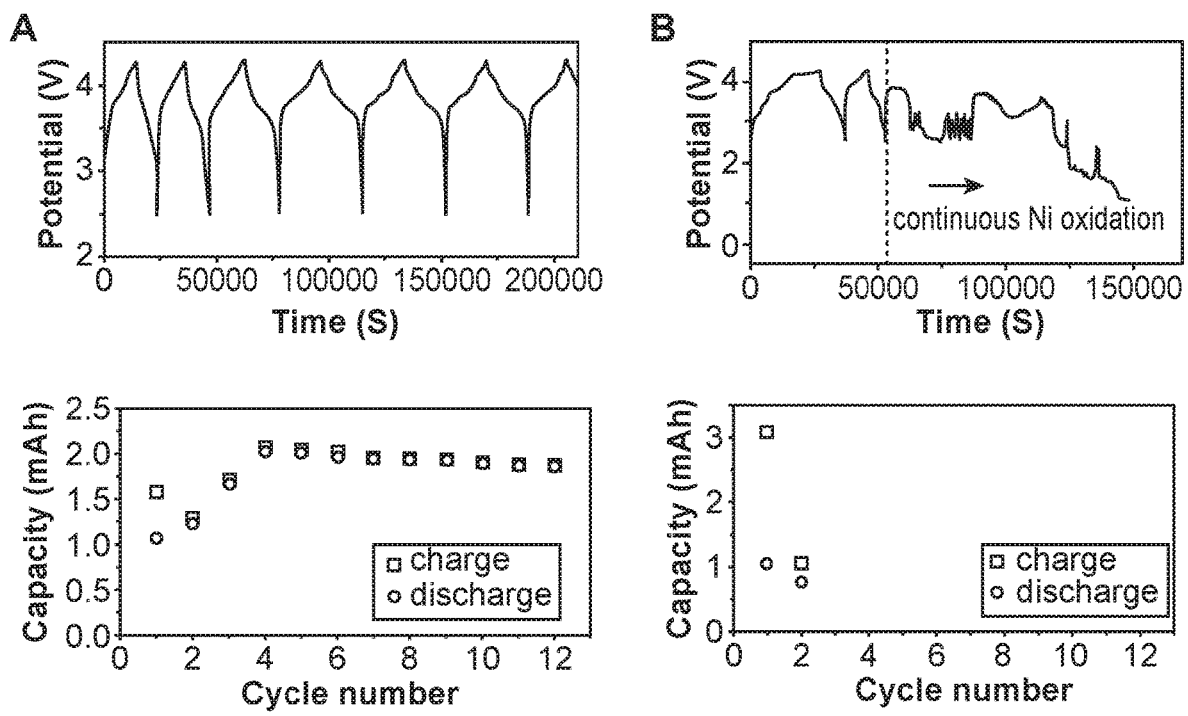

FIG. 15. Charge/discharge curves and capacity summary of $LiCoO_2$/graphite full cells made from GrNi—(a) and bare Ni-based (b) TRPS current collectors. The designed capacity of both cells is about 2.2 mAh. The battery with GrNi showed a capacity of about 2.1 mAh after 3 activation cycles, and the coulombic efficiency reached >about 99%. For battery with bare Ni, the initial charge capacity reached about 3 mAh, and a large part of the capacity derived from a voltage range below about 4 V, indicating strong oxidation-dissolution of Ni. The battery can be cycled for just 2 times and the later coulombic efficiency was low because of continuous dissolution of Ni. Some of such batteries cannot cycle to about 4.3 V (a typical charge cut-off voltage for $LiCoO_2$/graphite cell) at the first cycle. The possible reasons could be continuous oxidation-dissolution of Ni and gradually increased internal cell resistance.

Figure 16:
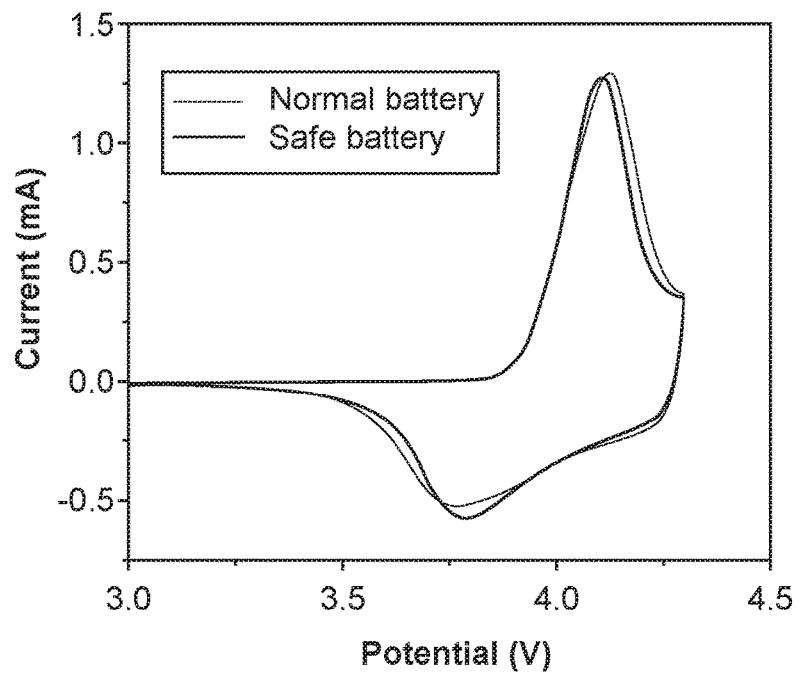

FIG. 16. Cyclic voltammograms of normal (using Al current collector) and safe $LiCoO_2$ batteries (after 3 initial cycles) at a scan rate of about 0.5 mV s$^{-1}$. Both batteries show similar redox characteristics, further confirming similar electrochemical activity and stability.

Figure 17:
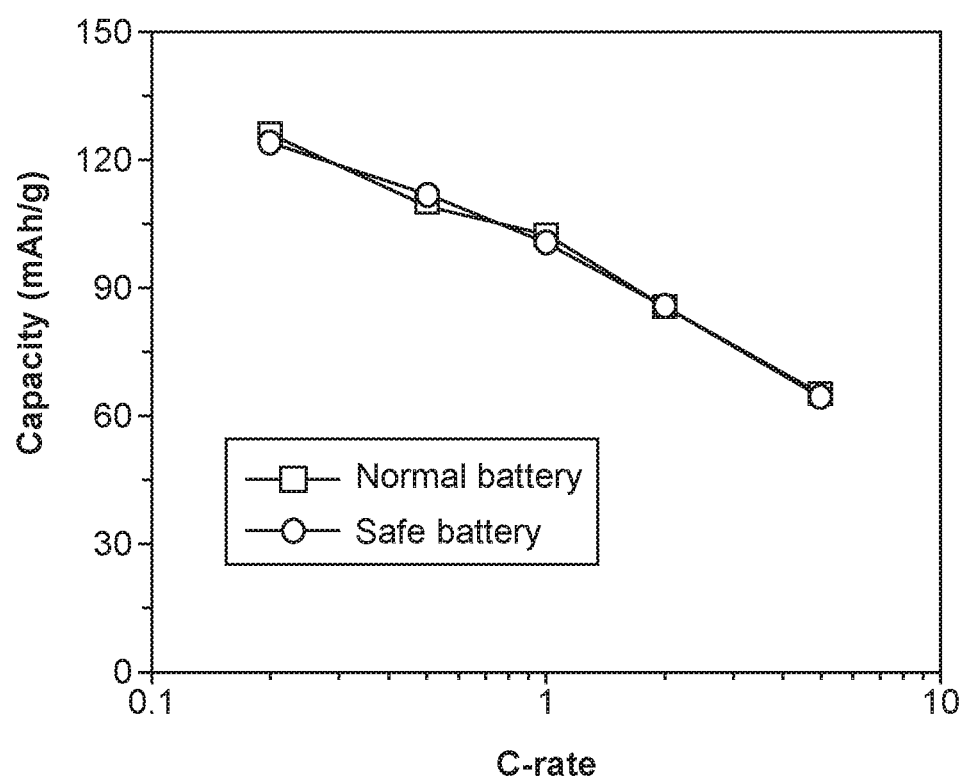

FIG. 17. Rate capability of normal and safe $LiCoO_2$-based batteries (after 5 initial galvanostatic cycles at about 0.2 C). Both batteries show similar rate performance. The relatively low capacity of $LiCoO_2$ in this experiment is due to a moderate quality of such cathode material that was obtained.

Figure 18:
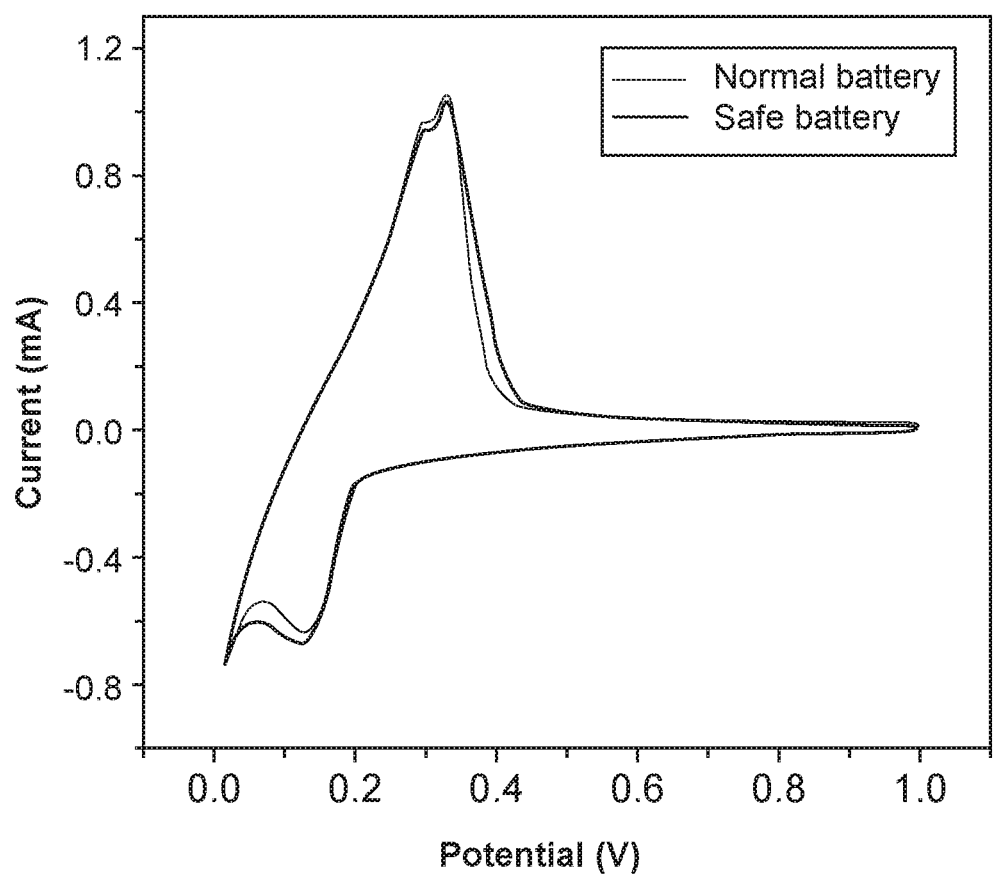

FIG. 18. Cyclic voltammograms of normal (using Cu current collector) and safe graphite-based batteries (after 3 initial cycles) at a scan rate of about 0.2 mV s$^{-1}$. Both batteries show similar redox characteristics, indicating similar electrochemical activity and stability.

Figure 19:
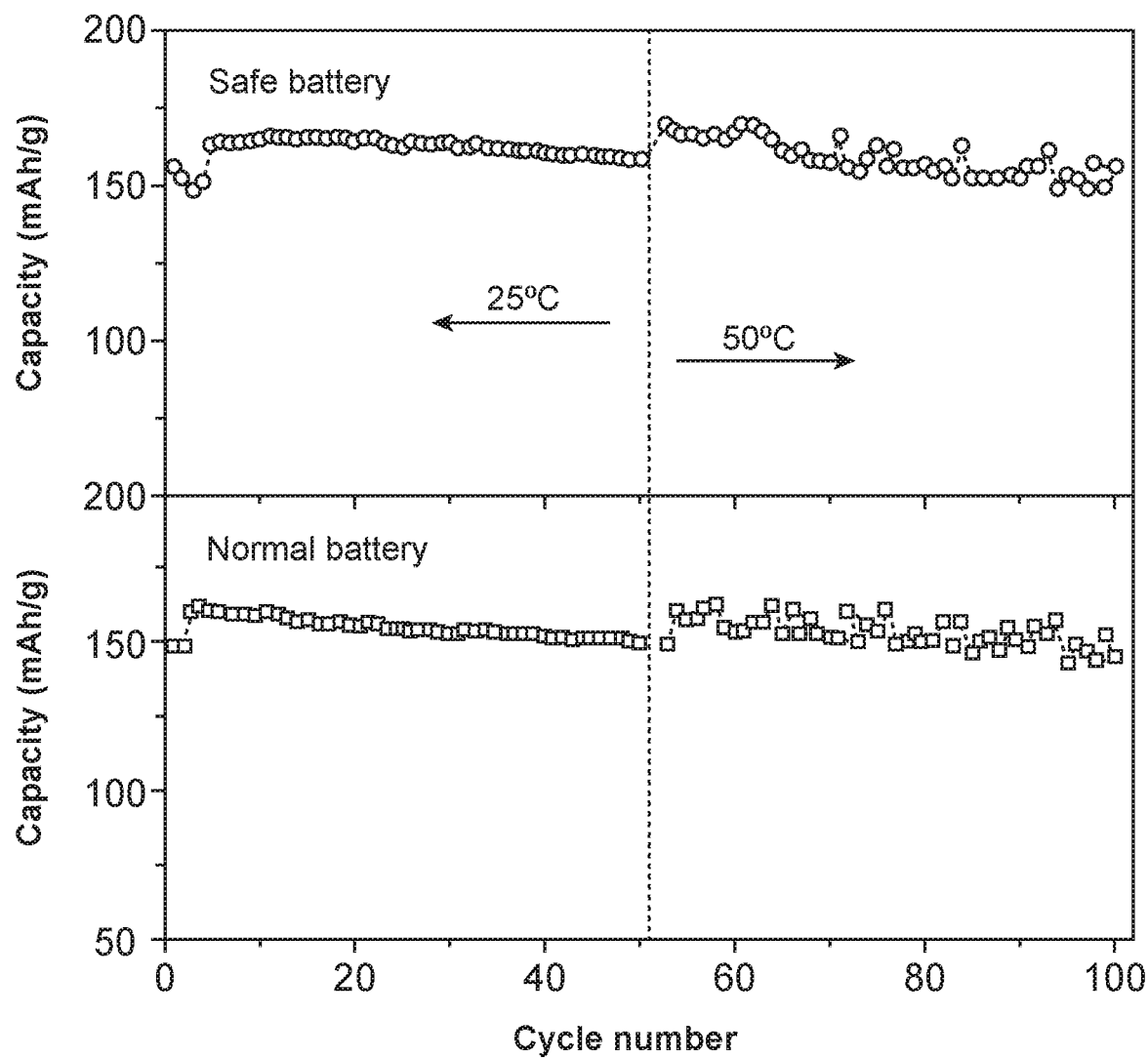

FIG. 19. Cycling stability of safe (top) and normal (bottom) $LiFePO_4$ batteries at about 25 and about 50° C., respectively. The batteries were first cycled at room temperature for about 50 cycles and then the environmental temperature was increased to about 50° C. (controlled by temperature chamber). To show intrinsic battery stability, a commercially available $LiFePO_4$ (which has better intrinsic cycling stability than $LiCoO_2$ at high temperature) was used as the electrochemically active material. The result shows that PE/GrNi (about 30 vol. % of GrNi) allows battery to cycle at good performance in a broad range of temperature. This temperature can be further tuned by changing the composition of TRPS.

Figure 20A:
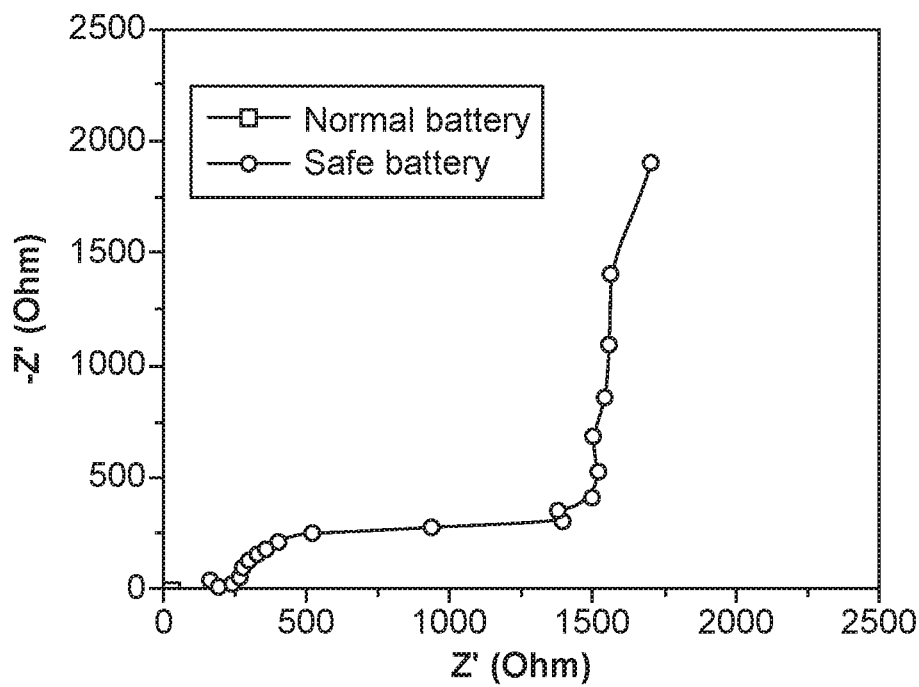
Figure 20B:
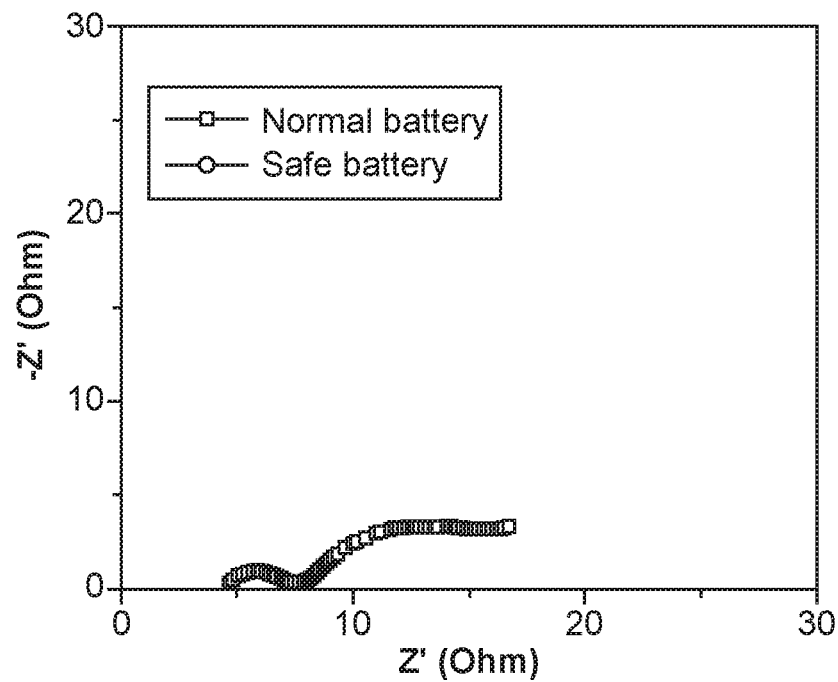

FIG. 20. Electrochemical impedance spectra (EIS) (Nyquist) of normal and safe $LiCoO_2$-based batteries after increasing the temperature to about 70° C. Both batteries show similar EIS at room temperature (FIG. 5e), while an equivalent series resistance (ESR) of normal $LiCoO_2$ battery decreased to about 15Ω due to de-lithiation and increased charge transfer at increased temperature. By comparison, the safe battery showed an ESR of about 1600Ω due to the switching of the TRPS electrode.

Figure 5:
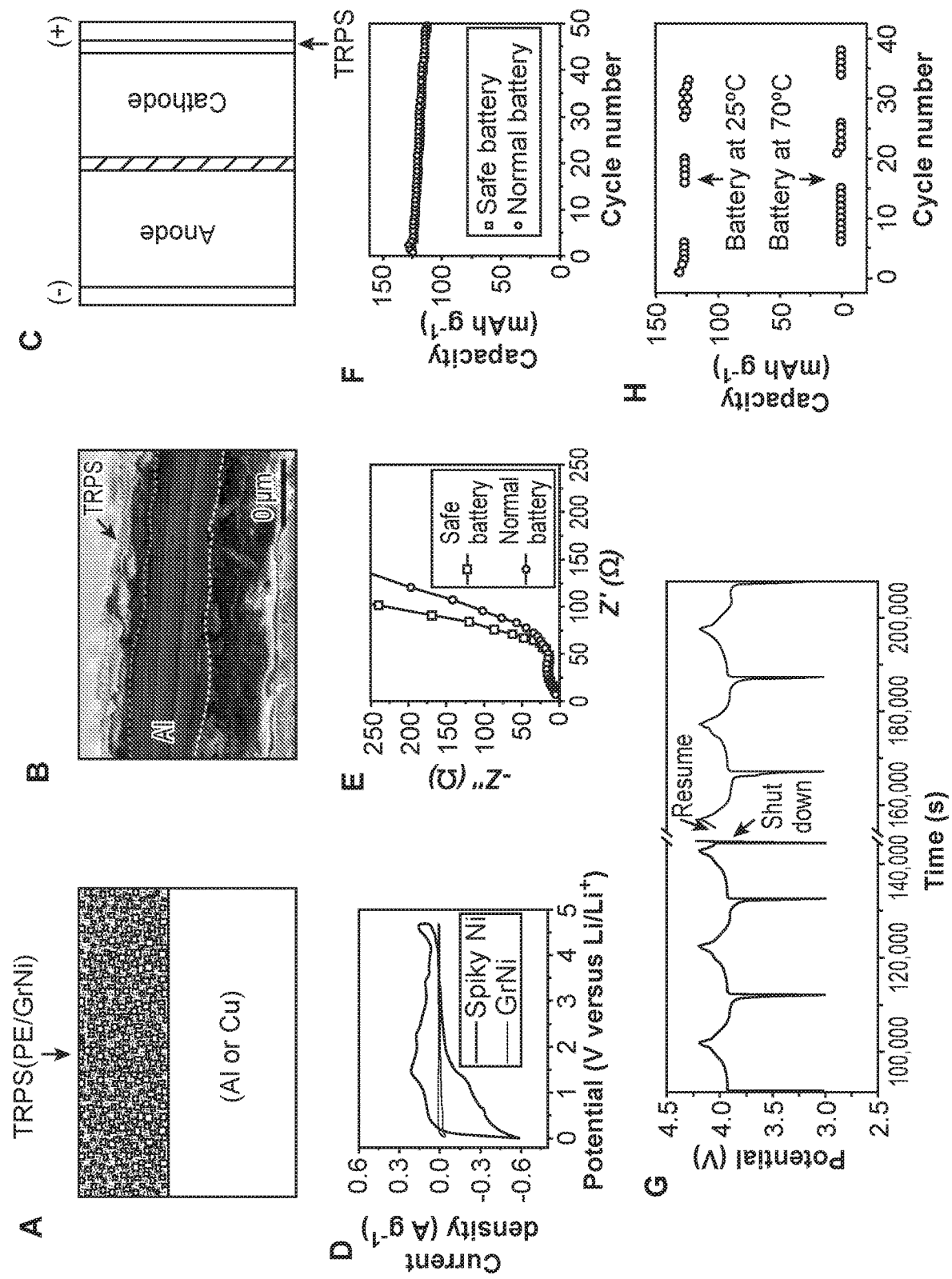
FIG. 5. Battery performance. a, Schematic illustration of TRPS film-coated current collectors. The composite can be coated on various substrates with good adhesion. b, SEM image of a PE/GrNi thin film (about 15 μm, about 20 vol. % GrNi) coated on an Al current collector (about 20 μm). c, Schematic illustration of a safe battery based on the TRPS film-coated Al as current collector, $LiCoO_2$ as cathode and lithium as anode. d, Cyclic voltammetry curves of original spiky Ni and GrNi (about 1 mg $cm^{-2}$) in the potential window of about 0.01-4.7 V (versus $Li/Li^+$). The GrNi shows a much smaller current from undesired side reactions. e, Electrochemical impedance spectra of normal and safe $LiCoO_2$ batteries at open-circuit voltage. f, Cycling behavior of normal and safe $LiCoO_2$ batteries at about 25° C. in the potential window of about 3.0-4.3 V. They show similar specific capacities (about 125 $mAhg^{-1}$) and capacity retention (about 95% after 50 cycles), indicating the excellent electrochemical stability of the PE/GrNi on the cathode side. g, Safe $LiCoO_2$ battery cycled at a charge or discharge in about 3 h followed by rapid shut-down on overheating (about 70° C.). The charge/discharge voltage profile is similar to a typical $LiCoO_2$ battery. After cooling to about 25° C., the same battery resumes its normal cycling. No noticeable change can be observed from the voltage profile. h, Capacity summary of the safe $LiCoO_2$ battery cycling between about 25° C. and shut-down. The near-zero capacity at about 70° C. indicates substantially full shut-down.
Figure 21A:
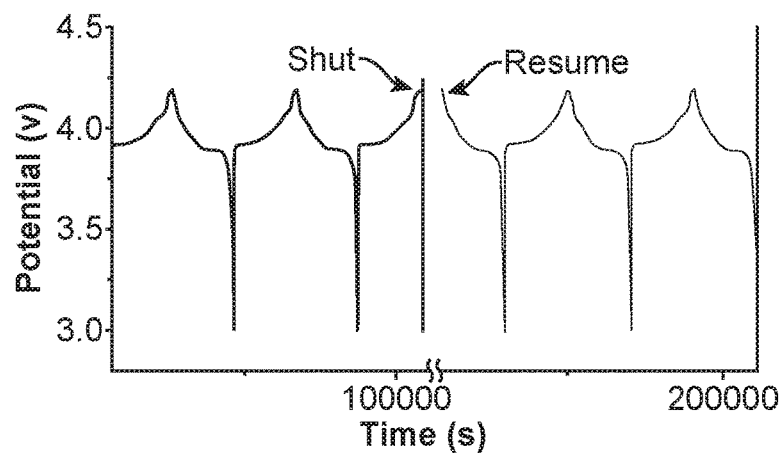
Figure 21B:
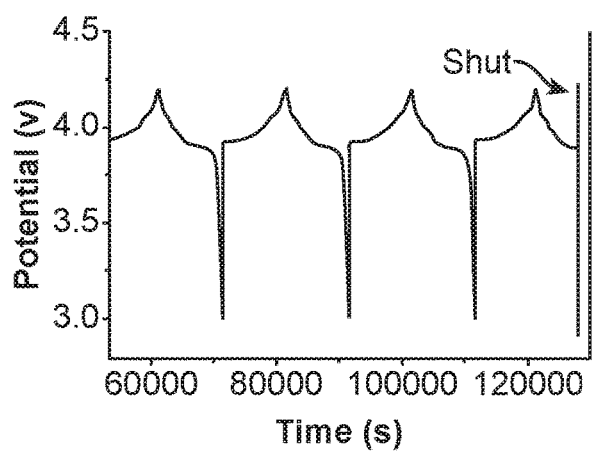
Figure 21C:
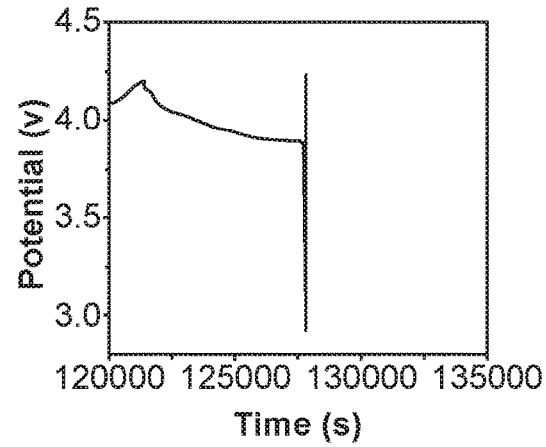

FIG. 21. The second (a) and third (b) shut-down of the same battery as shown in FIG. 5g. After the second shut-down, the battery resumed again and continued with the stable cycling. The battery was ramped to high temperature and then subjected to the third shut-down (b). FIG. 21(c) shows magnified region of the shut-down cycles in (b).

Figure 22A:
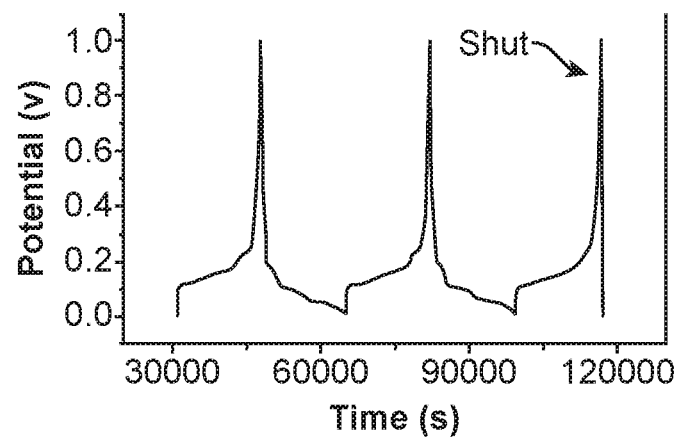
Figure 22B:
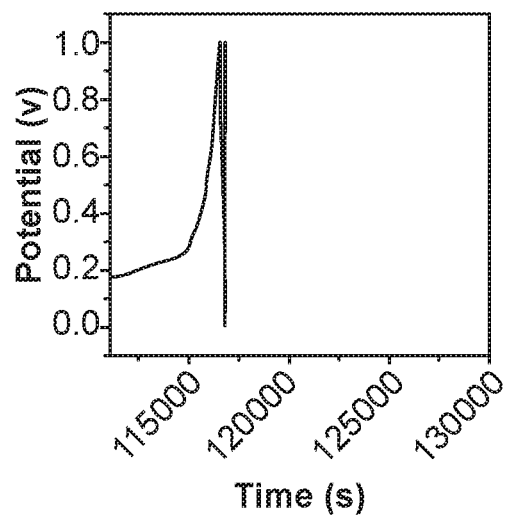
Figure 23A:
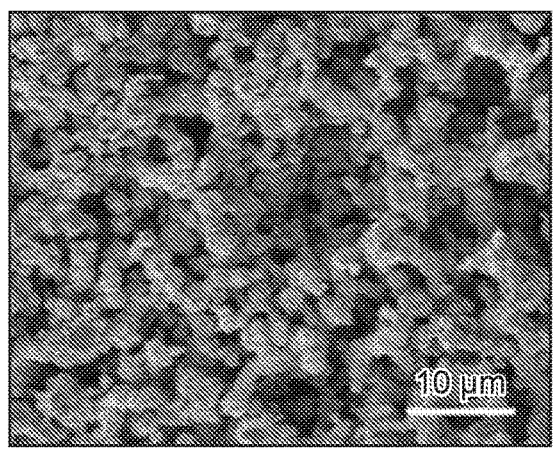
Figure 23B:
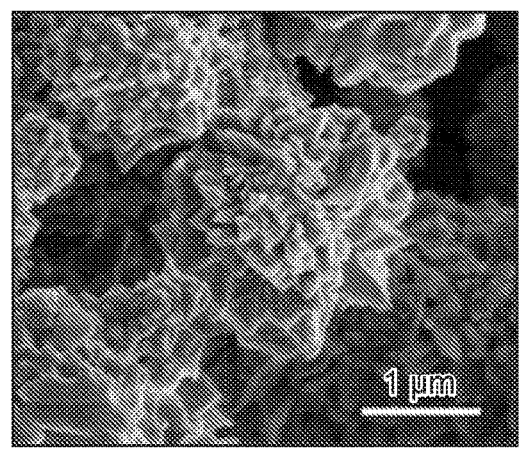
Figure 23C:
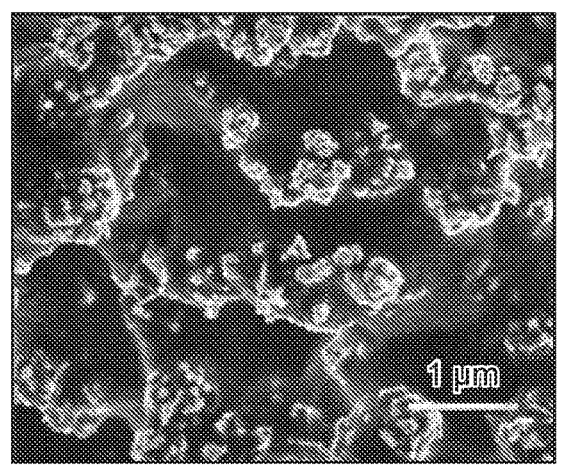
Figure 23D:
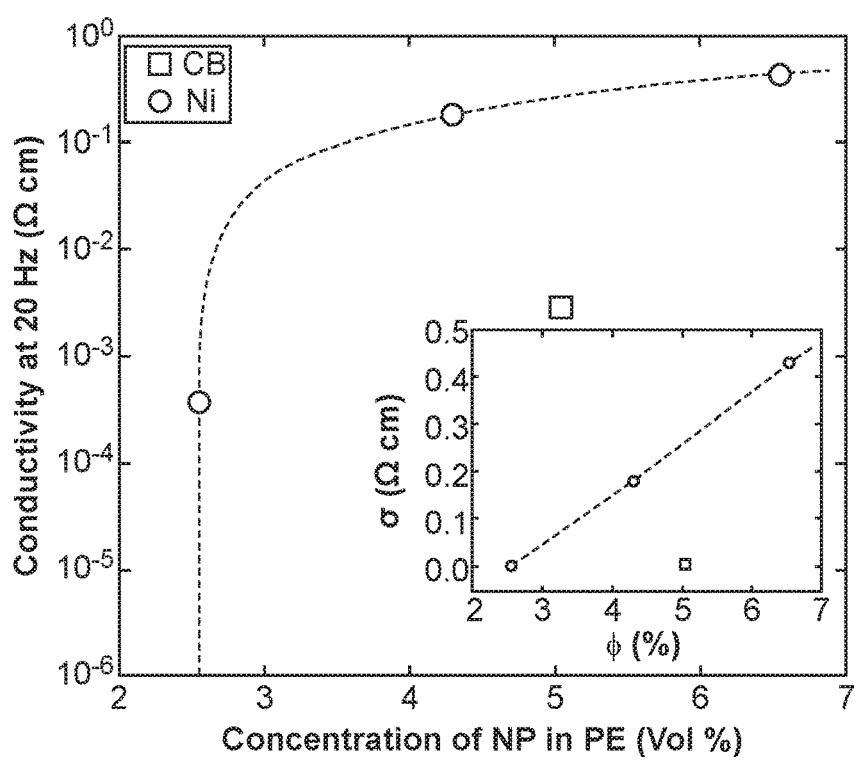

FIG. 22. Shut-down of graphite-based safe battery. (a) shows the normal cycling at about 25° C. and then the shut-down after temperature was increased to about 70° C. (b) shows magnified region of the shut-down cycles in (a).

FIG. 23. Structure and critical insulator-conductor transition for Ni/PE nanocomposite. (A) and (B) SEM images of nano-spiky Ni particles. (C) SEM images of Ni/PE composite, showing Ni particle network. (D) Electrical conductivity of Ni/PE composite. Conductivity increases with concentration of Ni particles following a power-law. Difference of values measured at low frequency f=about 20 Hz compared to DC conductivity data are negligible. Carbon black (CB) has been used as reference material (Inset shows the conductivity-concentration dependence in a linear scale).

Figure 24A:
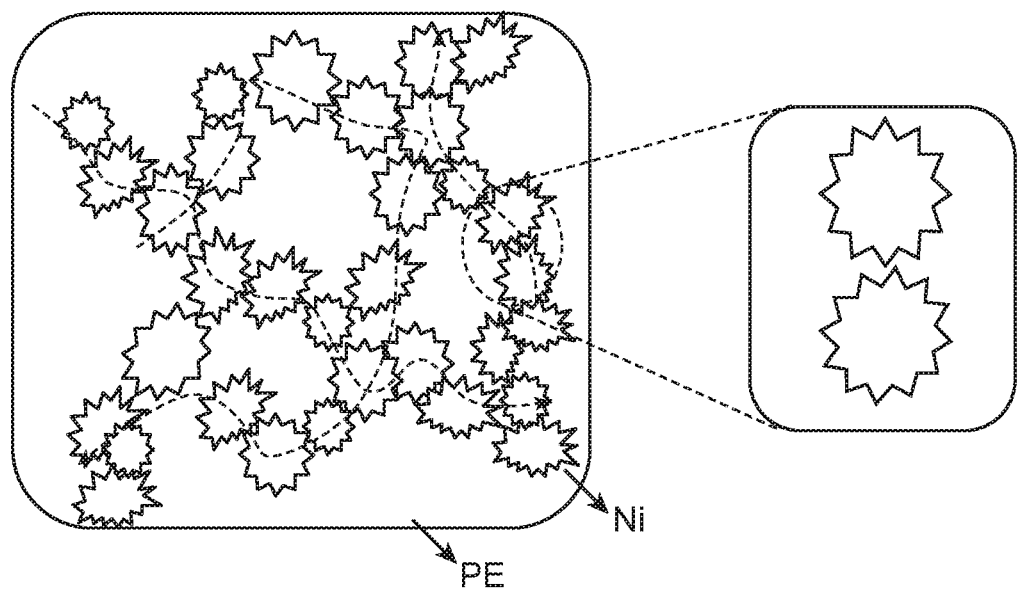
Figure 24B:
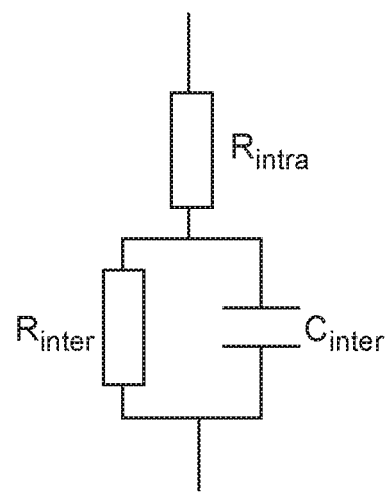

FIG. 24. Model of a Ni/PE composite: (A) Microstructural model of the Ni/PE composite. (B) Proposed electric circuit model that describes the charge transport used to fit measured data. $R_{intra}$=Intra-Cluster Resistance, $R_{inter}$=Inter-Grain Resistance, $C_{inter}$=Inter-Grain Capacitance.

Figure 25A:
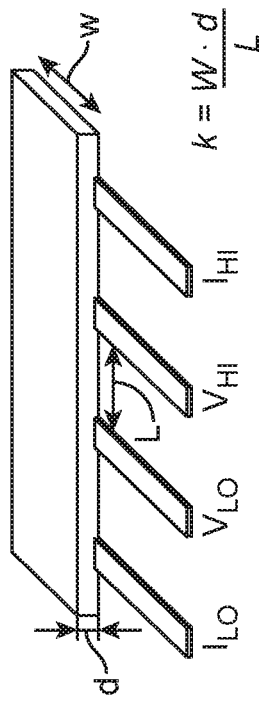

FIG. 25. Impedance-temperature dependence of Ni/PE composites. A) Measurement setup with LCR-Meter connected in 4-wire configuration and the geometrical factor, k. B) Nyquist plot of impedance spectra measured at different temperatures for Ni/PE nanocomposite with about 4.30 vol. % loading. Impedance values have been normalized with the geometrical factor k of the sample. Full symbols show measured data for the heating cycle, while continuous lines shown fitted curves. Inset shows Nyquist plot in the high conductivity range of the sample for temperatures from about 24° C.<T<about 40° C. C) Temperature dependence of fitted values for $R_{inter}$, $C_{inter}$, $R_{intra}$, and $R^2$ for heating and cooling. Inset, exponential fit according to $R_{inter-grain}$=A× exp(B×T), with A=about 0.0024 and B=about 0.248.

Figure 26:
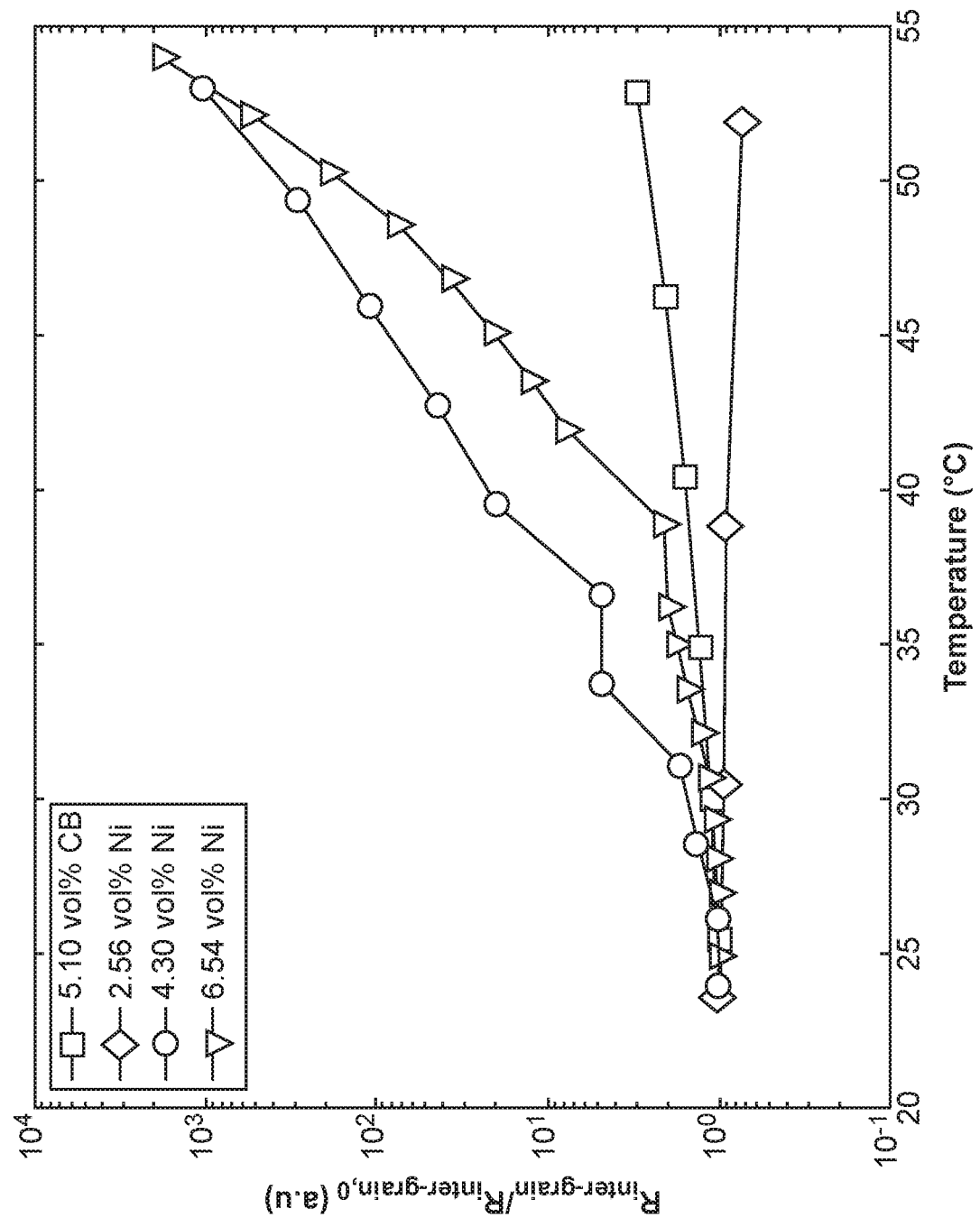

FIG. 26. Temperature dependence of $R_{inter}$=Inter-Grain Resistance for different composites. Inter-Grain resistance values are normalized with the room temperature value at T=300 K. Ni/PE composites at different loadings exhibit tunable electrical properties with different temperature sensitivity. CB/PE composite is shown as a reference material.

Figure 27:
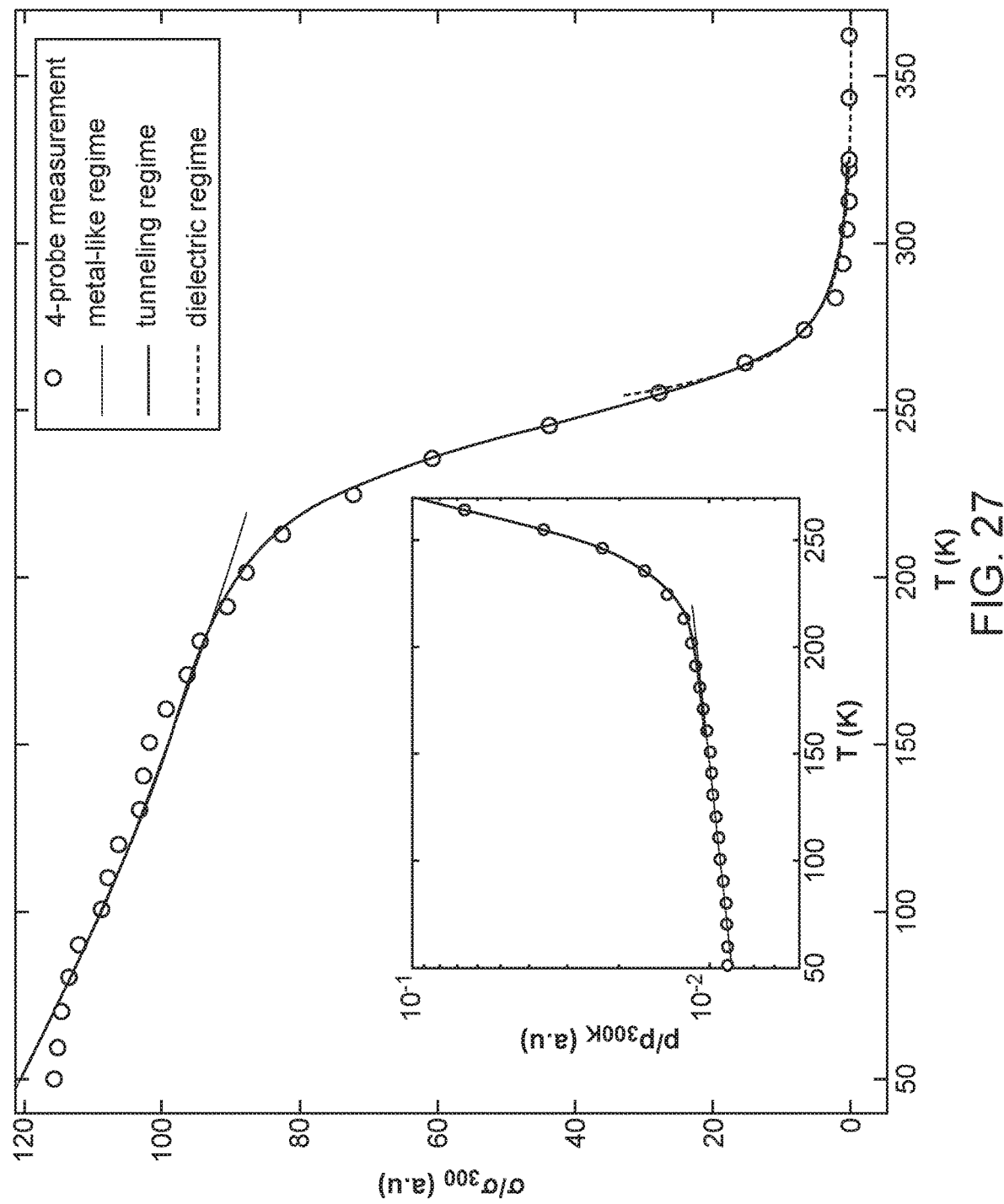

FIG. 27. Normalized electrical conductivity-temperature dependence. Ni/PE composite at about 4.30 vol. % of loading measured within a cryostat at temperature from about 50 K<T<about 360 K in a 4-wire configuration. For temperatures of about 50 K<T<about 190 K a metal-like behavior with linearly increasing resistivity as a function of temperature (ρ~$B_0$×T) is shown. For temperature from about 190 K<T<about 265 K a tunneling regime has been observed where the resistivity follows an exponential temperature dependence (ρ~exp($B_1$×T)). Finally, for temperature from about 265 K<T<about 360 K a dielectric regime has been observed with a stretched exponential temperature behavior proportional to exp[$B_2$/T].

Figure 28A:
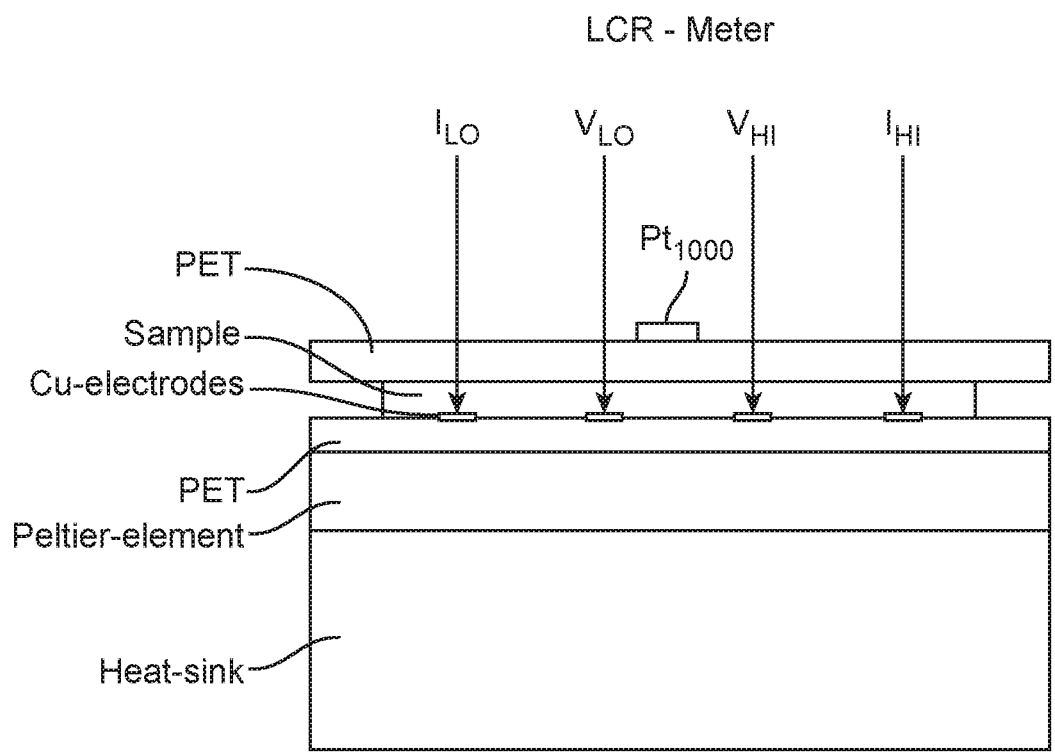
Figure 28B:
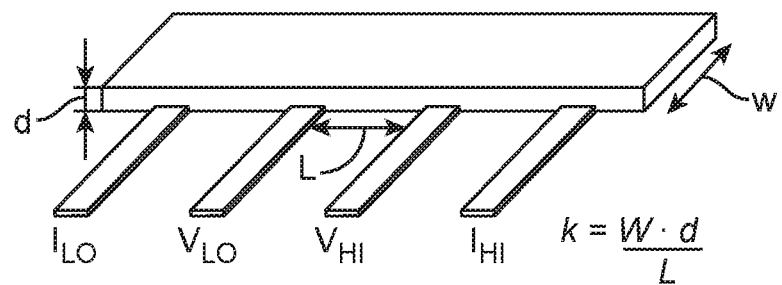

FIG. 28. Electrical measurement setup for temperature dependent impedance spectroscopy. (A) For the temperature dependent impedance measurement under ambient pressure conductive polymer composites are sandwiched between two polyethylene terephthalate (PET) sheets and electrically connected using Cu electrodes. (B) Schematic view of sample dimensions and geometrical factor k.

Figure 29:
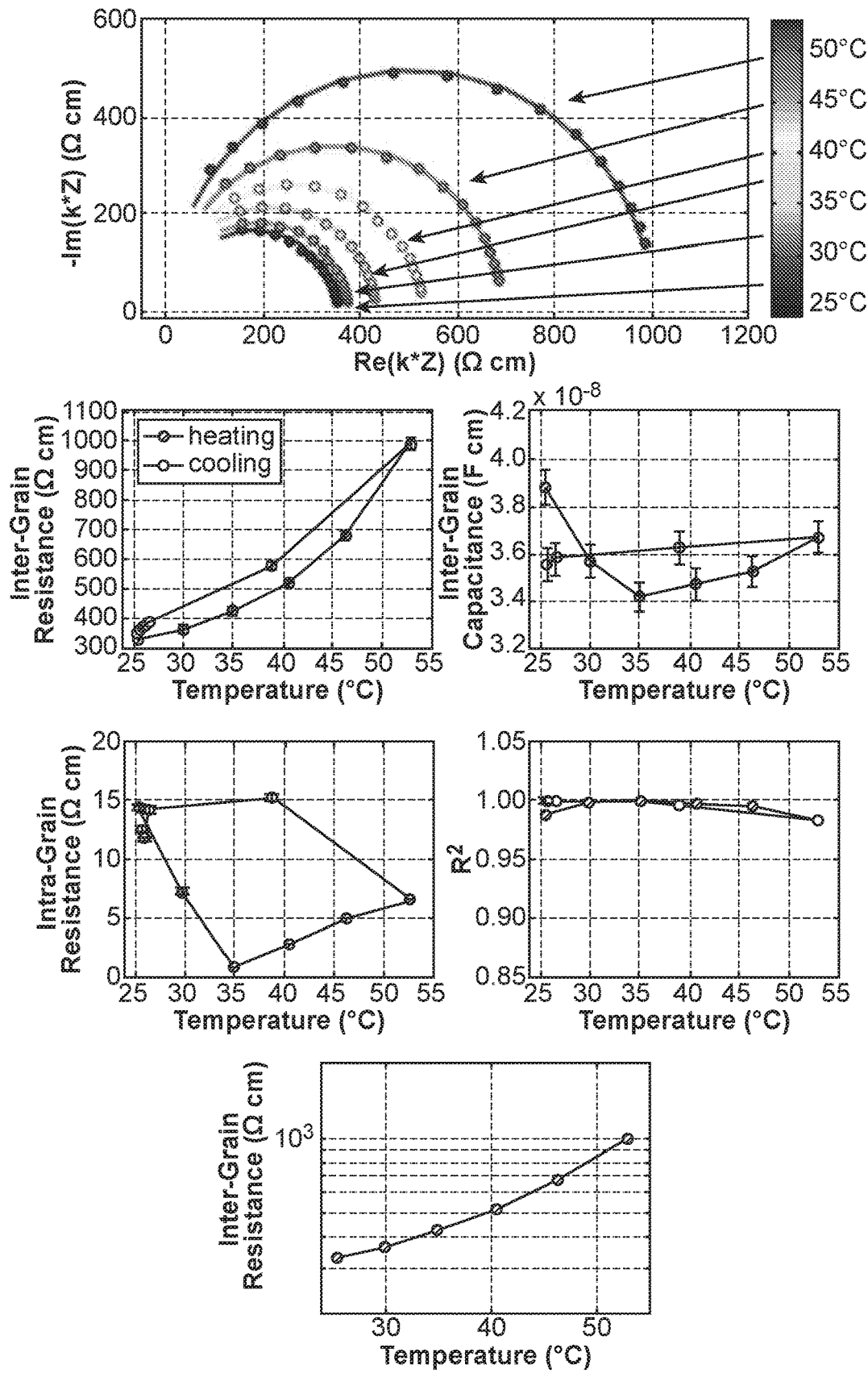

FIG. 29. Temperature dependent impedance spectra for about 5.10 vol. % of carbon black (CB) loading. Temperature dependence of $R_{inter}$, $R_{intra}$, $C_{inter}$ and $R^2$ of the fit for heating and cooling.

Figure 30:
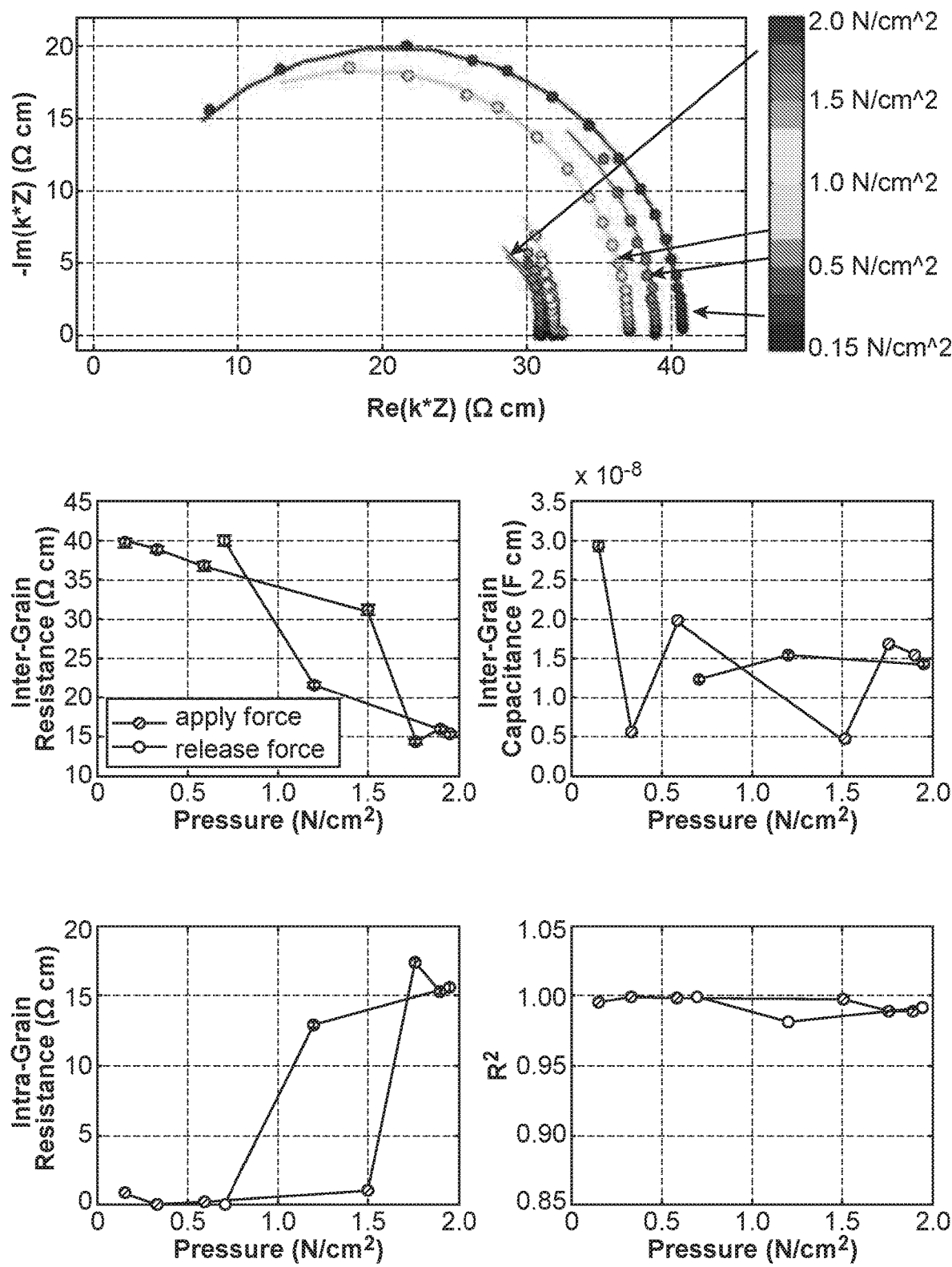

FIG. 30. Pressure dependent impedance spectra for about 4.30 vol. % of nickel loading. Hydrostatic pressure dependence of $R_{inter}$, $R_{intra}$, $C_{inter}$ and $R^2$ of the fit for contraction and expansion of the sample, respectively.

Figure 31:
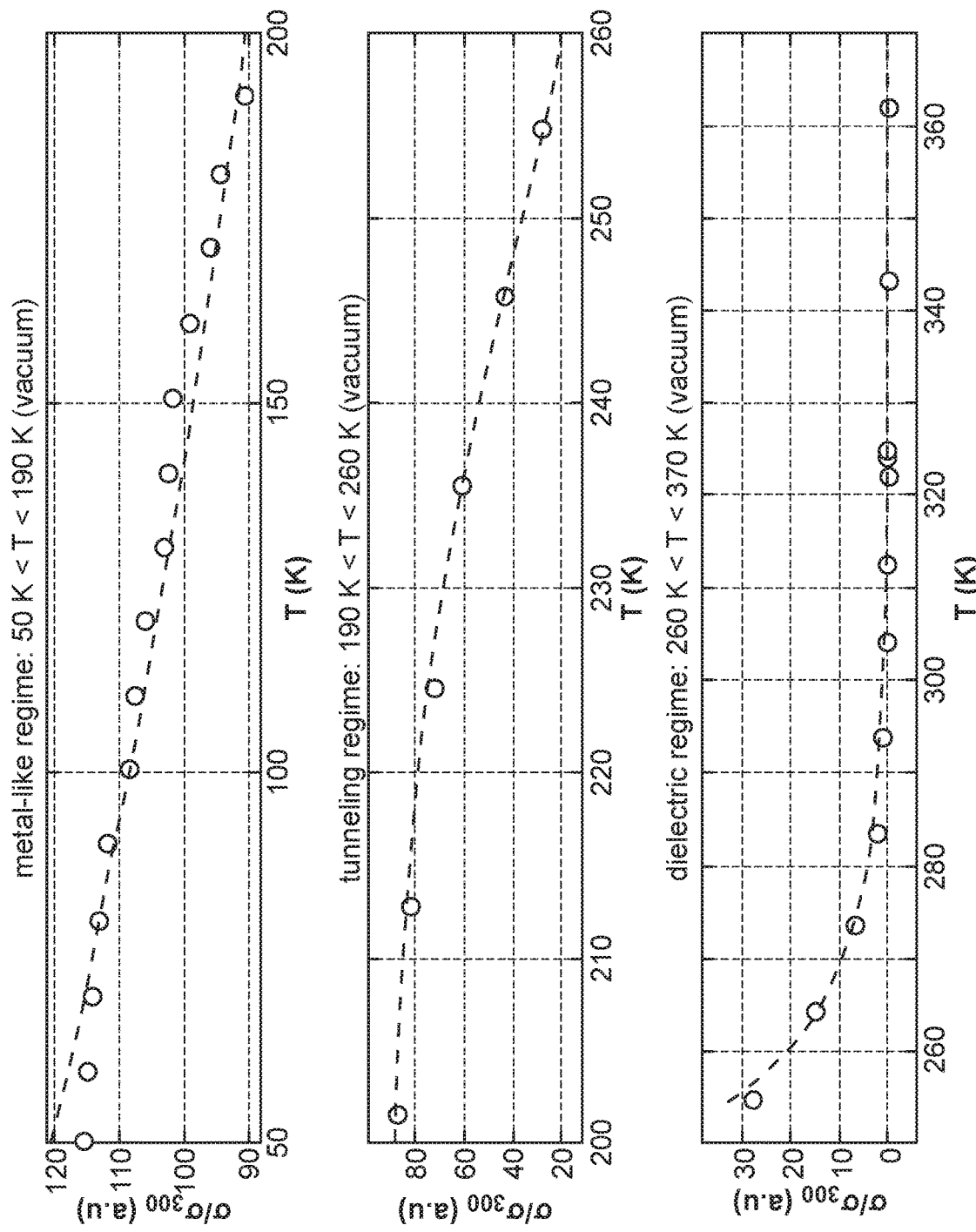

FIG. 31. Temperature dependent conductivity of about 4.30 vol. % Ni/PE composite. (Top) Metal like behavior measured in the temperature range from about 50 K<T<about 190 K fitted according to: $\rho \sim A_0 + B_0 \times T$, with $A_0$=about 0.81 S/cm and $B_0$=about 0.002 S/(cm K), $R^2$=about 0.9997. $A_0$ corresponds to the minimum resistivity of the composite measured in vacuum, while $B_0$ corresponds to the linear temperature coefficient. (Middle) Tunneling regime measured in the temperature range from about 190 K<T<about 265 K fitted according to: $\rho \sim A_1 \times \exp[B_1 \times T]$, with $A_1$=about $8.5 \times 10^{-10}$ S/cm and $B_1$=about 0.08 S/(cm K), $R^2$=about 0.9997. (Bottom) Dielectric regime measured in the temperature range from about 265 K<T<about 360 K fitted according to: $\sigma \sim A_2 \times \exp[B_2/T]$, with $A_2$=$5.8 \times 10^{-11}$ S/cm and $B_2$=5690 K, $R^2$=about 0.9845. $A_2$ corresponds to the minimum conductivity of the composite. All values shown on the graphs have been normalized with the conductivity at room temperature and vacuum: $\sigma_{300K}$=about 9 mS/cm.

DESCRIPTION

Thermoresponsive Polymer Composites

Embodiments of this disclosure relate to thermoresponsive polymer composites and applications of such composites. In some embodiments, a thermoresponsive polymer composite includes a polymeric matrix and conductive fillers dispersed in the matrix. The composite can have an initial electrical conductivity, and, upon a dimensional change of the composite, such as expansion or contraction induced by a temperature variation, the electrical conductivity of the composite can undergo a rapid and considerable change. Moreover, the change in electrical conductivity is repeatedly reversible upon recovery of an initial dimension of the composite.

A composite of some embodiments includes a polymeric matrix that includes one or more polymers. Depending on the particular application, a single type of polymer can be included, or two or more different types of polymers can be included. Suitable polymers include those with a high (linear) thermal expansion coefficient, such as at least about 80 micrometer/(meter Kelvin) (or μm/(m K)), at least about 100 μm/(m K), at least about 120 μm/(m K), at least about 140 μm/(m K), at least about 160 μm/(m K), or at least about 180 μm/(m K), and up to about 200 μm/(m K) or more, or up to about 220 μm/(m K) or more, and a low electrical conductivity, such as no greater than about $10^{-5}$ S/cm, no greater than about $10^{-7}$ S/cm, no greater than about $10^{-9}$ S/cm, no greater than about $10^{-11}$ S/cm, or no greater than about $10^{-13}$ S/cm, and down to about $10^{-15}$ S/cm or less, or down to about $10^{-17}$ S/cm or less. Suitable polymers include semi-crystalline polymers having a melting temperature of up to about 180° C., such as up to about 170° C., up to about 150° C., up to about 130° C., or up to about 110° C., and down to about 90° C. or less, or down to about 80° C. or less. Specific examples of suitable polymers include polyolefins, such as polyethylene and polypropylene; polyethers, such as polyethylene oxide; and fluoropolymers, such as polyvinylidene fluoride.

A composite of some embodiments also includes conductive fillers dispersed in a polymeric matrix. Depending on the particular application, a single type of conductive fillers can be included, or two or more different types of conductive fillers can be included. In general, conductive fillers can include conductive microstructures, conductive nanostructures, and combinations of conductive microstructures and conductive nanostructures. To impart electrical conductivity, conductive fillers can be formed of a material that is electrically conductive or semiconducting, or can be a heterostructure formed of a combination of materials having a combination of characteristics, such as in a core-shell or multi-layered configuration. Suitable materials for conductive fillers include those with a low (linear) thermal expansion coefficient, such as no greater than about 50 μm/(m K), no greater than about 40 μm/(m K), no greater than about 30 μm/(m K), no greater than about 20 μm/(m K), or no greater than about 15 μm/(m K), and down to about 13 μm/(m K) or less, or down to about 10 μm/(m K) or less, and a high electrical conductivity, such as at least about 1 S/cm, at least about 10 S/cm, at least about $10^2$ S/cm, at least about $10^3$ S/cm, or at least about $10^4$ S/cm, and up to about $10^5$ S/cm or more, or up to about $10^6$ S/cm or more. For example, conductive fillers can be formed of a metal, a metal alloy, a metal silicide, a metal nitride, a metal sulfide, a metal carbide, a semiconductor, an electrically conductive polymer, a doped form of a metal oxide, or a combination of such materials, and, more particularly, conductive fillers can be formed of copper, nickel, zinc, aluminum, titanium, iron, stainless steel, a Group 14 element (e.g., carbon, silicon or germanium), a Group 14-14 binary alloy (e.g., silicon carbide), a Group 12-16 binary alloy (e.g., zinc oxide), a Group 13-15 binary alloy (e.g., aluminum nitride), or another binary, ternary, quaternary, or higher order alloy of Group 11 elements, Group 12 elements, Group 13 elements, Group 14 elements, Group 15 elements, Group 16 elements, and Group 17 elements.

Conductive fillers can have any of a variety of shapes, such as spheroidal, spherical, tetrahedral, tripodal, disk-shaped, pyramid-shaped, box-shaped, cube-shaped, cylindrical, tubular, wire-shaped, branch-shaped, and a number of other geometric and non-geometric shapes. Examples of conductive fillers include metal nanowires, metal microwires, metal nanoparticles, metal microparticles, core-shell nanowires, core-shell microwires, core-shell nanoparticles, and core-shell microparticles. In some embodiments, conductive fillers include metal microparticles, such as nickel microparticles, having dimensions (or having an average dimension or an average diameter) in a range from about 1 μm to about 100 μm, from about 1 μm to about 10 μm, or from about 1 μm to about 5 μm.

In some embodiments, at least a subset of conductive fillers can have surface texturing, such as protrusions in the form of peaks or spikes, or other surface roughness. The use of conductive fillers having surface texturing can promote a higher electrical conductivity of a composite at a lower loading level of the fillers, and a higher thermal sensitivity of the composite. Surface texturing of conductive fillers also can promote wetting of the conductive fillers, and improve dispersion of the conductive fillers in a polymeric matrix. In some embodiments, conductive fillers include metal microparticles having surface texturing and, in particular, metal microparticles each including a core and protrusions extending from the core, and where the protrusions have longitudinal dimensions (or have an average longitudinal dimension or an average length) in a range from about 5 nm to about 1 µm, from about 10 nm to about 800 nm, from about 50 nm to about 500 nm, or from about 100 nm to about 500 nm.

In some embodiments, at least a subset of conductive fillers can include a conductive coating or shell to stabilize surfaces of the fillers, such as by imparting greater electrochemical stability in the case of battery applications. In some embodiments, conductive fillers include metal microparticles having surface texturing and, in particular, metal microparticles each including a core and protrusions extending from the core, and each including a conductive coating or shell at least partially covering the core and the protrusions, and where the conductive coating or shell has a thickness in a range from about 0.5 nm to about 100 nm, from about 1 nm to about 80 nm, from about 1 nm to about 50 nm, from about 1 nm to about 20 nm, or from about 5 nm to about 10 nm. Suitable materials for a conductive coating include carbonaceous materials, such as graphene, although other materials previously listed as suitable materials for conductive fillers also can be used.

In some embodiments, conductive fillers can be included in a composite at a loading level in a range from about 0.5% to about 50% by volume of the composite, such as from about 0.5% to about 40%, from about 0.5% to about 30%, from about 0.5% to about 20%, from about 0.5% to about 10%, from about 0.5% to about 15%, from about 5% to about 15%, from about 10% to about 15%, from about 15% to about 50%, from about 15% to about 30%, from about 20% to about 30%, from about 30% to about 40%, or from about 30% to about 50%. In some embodiments, conductive fillers can be included in a composite at a loading level in a range from about 0.5% to about 90% by weight of the composite, such as from about 0.5% to about 35%, from about 5% to about 35%, from about 10% to about 35%, from about 35% to about 90%, from about 35% to about 70%, from about 50% to about 70%, or from about 35% to about 50%.

Thermoresponsive polymer composites of some embodiments of this disclosure can exhibit a number of desirable properties. For example, an electrical conductivity of a composite in at least one state of the composite, such as under ambient or normal operating conditions of temperature and pressure, can be at least about 0.5 S cm$^{-1}$, at least about 1 S cm$^{-1}$, at least about 5 S cm$^{-1}$, at least about 10 S cm$^{-1}$, at least about 20 S cm$^{-1}$, at least about 30 S cm$^{-1}$, at least about 40 S cm$^{-1}$, or at least about 45 S cm$^{-1}$, and up to about 50 S cm$^{-1}$ or more, or up to about 60 S cm$^{-1}$ or more. Upon a dimensional change of the composite into another state, such as expansion or contraction induced by a temperature rise or fall across a switching temperature ($T_s$), or induced by a mechanical stimulus, the electrical conductivity of the composite can undergo a rapid and considerable change, such as an increase or a decrease by a factor of at least about $10^2$, at least about $10^3$, at least about $10^4$, at least about $10^5$, at least about $10^6$, or at least about $10^7$, and up to about $10^8$ or more, or up to about $10^9$ or more, and within a response time of no greater than about 50 seconds, no greater than about 40 seconds, no greater than about 30 seconds, no greater than about 20 seconds, no greater than about 10 seconds, no greater than about 5 seconds, or no greater than about 1 second. A switching temperature ($T_s$) of a composite can be in a range from about 40° C. to about 120° C., from about 40° C. to about 100° C., from about 50° C. to about 100° C., from about 50° C. to about 80° C., or from about 50° C. to about 70° C.

Applications of Thermoresponsive Polymer Composites

Thermoresponsive polymer composites described herein can be used in a number of applications ranging from, for example, electrode structures for batteries and other electrochemical energy storage devices, thermistors, temperature sensors, and pressure sensors.

Figure 1A:
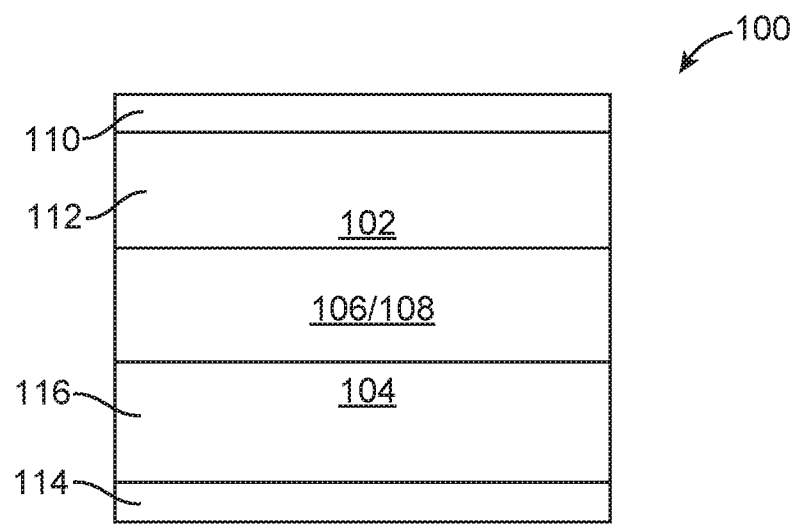
FIG. 1A. Schematic of a battery of some embodiments.

FIG. 1A shows a schematic of a battery 100, which includes a cathode structure (or a first electrode structure) 102, an anode structure (or a second electrode structure) 104, and a separator 106 that is disposed between the cathode structure 102 and the anode structure 104. The battery 100 also includes an electrolyte 108, which is disposed between the cathode structure 102 and the anode structure 104. The cathode structure 102 includes a current collector 110 and a cathode 112 disposed adjacent to the current collector 110, where the cathode 112 is formed of a cathode active material. The anode structure 104 includes a current collector 114 and an anode 116 disposed adjacent to the current collector 114, where the anode 116 is formed of an anode active material. Either, or both, of the current collector 110 and the current collector 114 can include a thermoresponsive polymer composite. For example, the current collector 110 can include a metal layer and a layer of a thermoresponsive polymer composite coated over the metal layer and disposed between the metal layer and the cathode 112. As another example, the current collector 114 can include a metal layer and a layer of a same or different thermoresponsive polymer composite coated over the metal layer and disposed between the metal layer and the anode 116. A thickness of the layer of the thermoresponsive polymer composite can be in a range from about 1 µm to about 100 µm, from about 1 µm to about 80 µm, or from about 1 µm to about 50 µm.

Figure 1B:
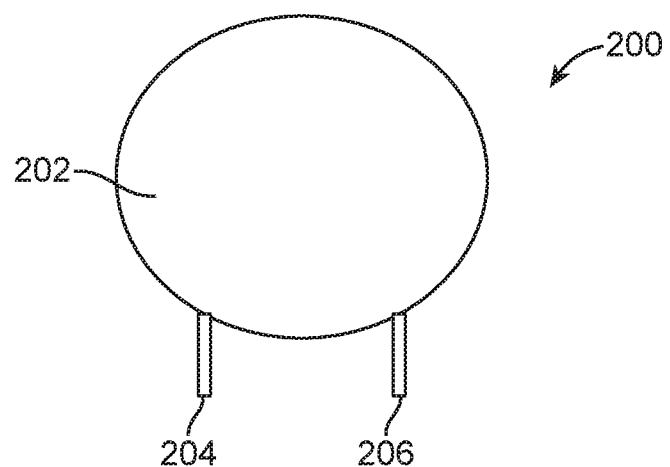
FIG. 1B. Schematic of a temperature sensor of some embodiments.

FIG. 1B shows a schematic of a temperature sensor 200, which includes a sensor body 202 and a pair of electrical contacts 204 and 206 which are electrically connected to the sensor body 202. The sensor body 202 includes a thermoresponsive polymer composite. For example, the sensor body 202 can include a substrate and a layer of a thermoresponsive polymer composite coated over the substrate and electrically connected between the electrical contact 204 and the electrical contact 206. A similar configuration as shown in FIG. 1B can be implemented for a pressure sensor or a thermistor.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Fast and Reversible Thermoresponsive Polymer Switching Materials for Safer Batteries Overview: Safety issues have been a long-standing obstacle impeding large-scale adoption of next-generation high-energy-density batteries. Materials solutions to battery safety management are constrained by slow response and small operating voltage windows. Here this example reports a fast and reversible thermoresponsive polymer switching material that can be incorporated inside batteries to prevent thermal runaway. This material includes electrochemically stable graphene-coated spiky nickel particles mixed in a polymer matrix with a high thermal expansion coefficient. The as-fabricated polymer composite films show high electrical conductivity of up to about 50 S cm$^{-1}$ at room temperature. Importantly, the conductivity decreases within about one second by seven to eight orders of magnitude on reaching its transition temperature and spontaneously recovers at room temperature. Batteries with this self-regulating material built in an electrode can rapidly shut down under abnormal conditions such as overheating and shorting, and are able to resume their normal function without performance compromise or detrimental thermal runaway. The approach offers about $10^3$-$10^4$ times higher sensitivity to temperature changes than other switching devices.

Introduction: Reliable and high-performance lithium-ion batteries (LIBs) are highly desirable for consumer electronics, electrical vehicles and grid energy storage. Whereas the energy density, power density and cycling life of LIBs have been significantly improved in the past two decades, battery safety remains an important and unresolved issue. A high battery specific energy density generally increases the energetic response when the batteries are subjected to abuse. Safety issues have become a major obstacle impeding the large-scale application of high-energy-density LIBs.

To ensure good performance, LIBs generally operate within a constrained range of current density, voltage and temperature. However, at an abnormal temperature (for example, >150° C.), typically caused by shorting, overcharging or other abuse conditions, a series of exothermic reactions can be initiated and rapidly propagate to further increase the internal cell temperature and pressure, which results in catastrophic battery explosion and fire. Commercial LIBs are equipped with external pressure release vents and positive temperature coefficient (PTC) resistors on their cases to prevent overpressure and overheating. However, pressure and temperature increases inside cells can occur at much higher speeds than can be detected by these external devices. Thus, internal safety strategies are more effective in preventing thermal runaway.

Here, this example reports fast and reversible thermoresponsive polymer switching (TRPS) incorporated internally into electrodes. The material includes conductive graphene-coated spiky nanostructured (nano-spiky) nickel particles as the conductive filler and a polymer matrix with a large thermal expansion coefficient. The nano-spikes on the particle surface provide a high electrical conductivity ($\sigma$) at a low filler fraction and a high thermal sensitivity, which is not achieved with fillers such as carbon black (CB) or metal particles. The graphene coating stabilizes the metal particle surface, providing high electrochemical stability towards oxidation and electrolyte decomposition. The as-fabricated polymer composite films show values of $\sigma$ of up to about 50 S cm$^{-1}$ at room temperature, about $10^2$ times higher than typical conductive polymer composites. The value of $\sigma$ decreases in less than a second by seven to eight orders of magnitude on approaching the transition temperature and returns to high conductivity after cooling. The TRPS device is about $10^3$-$10^4$ times more sensitive to temperature change than other switching devices. Batteries with this internally incorporated TRPS show excellent cell function in a wide voltage window at normal temperature, and rapid shut-down at abnormal conditions (for example, overheating or shorting). The batteries can also resume normal function repeatedly without performance compromise even after multiple overheating events. This approach provides a combination of reliability, fast response time, and reversibility without sacrificing battery performance.

Figure 2:
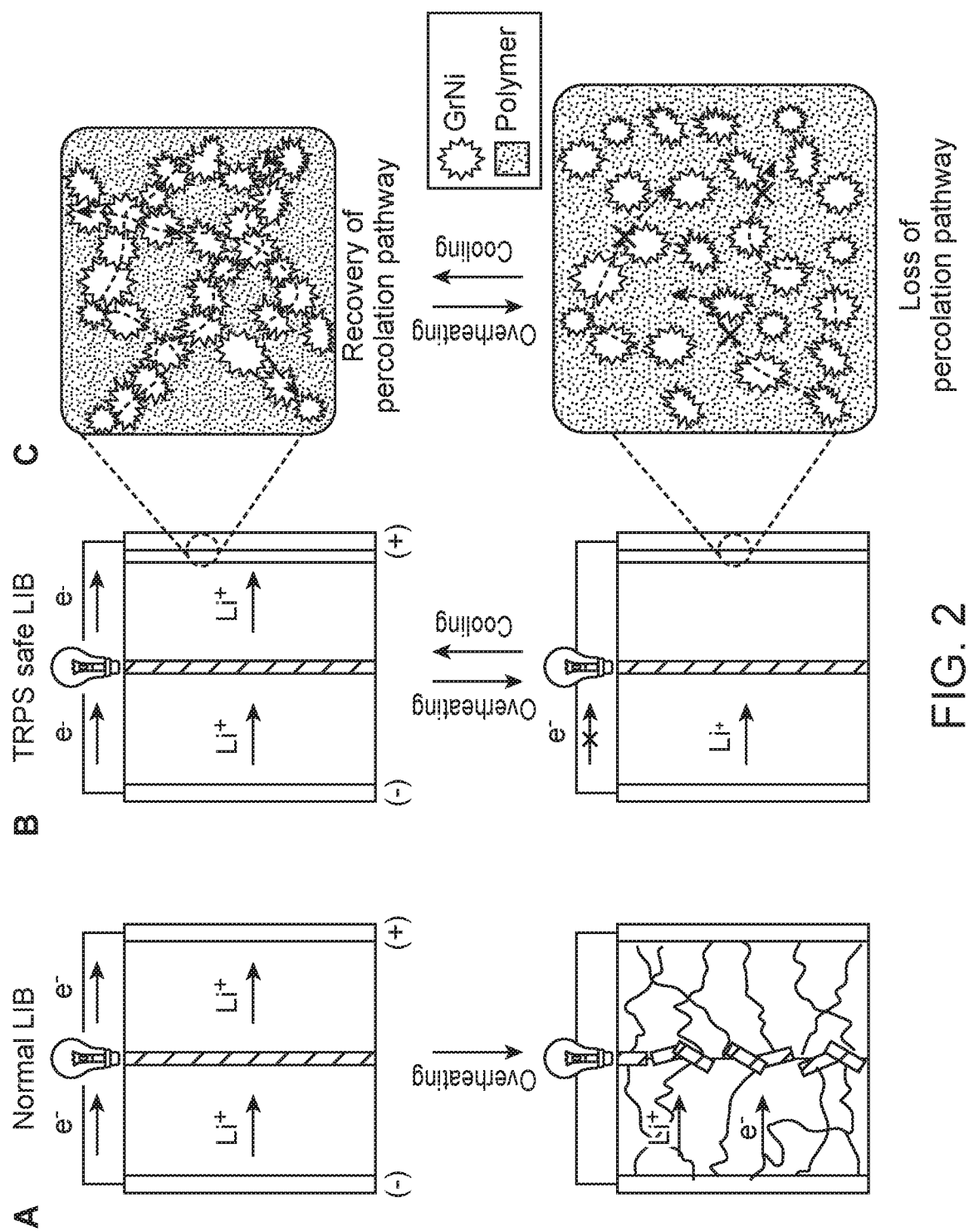
FIG. 2. Schematic illustration of safe battery design. a, A LIB includes an anode (for example, graphite coated on copper (Cu)), a separator (for example, porous polyolefin), a cathode (for example, $LiCoO_2$ coated on aluminum (Al)) and a flammable electrolyte. On abnormal heating, the separator will melt, resulting in internal shorting of the battery. The marked increase in temperature will cause thermal runaway and permanently damage the battery structure. b, The safe battery has one or two current collectors coated with a thin thermoresponsive polymer switching (TRPS) layer. It operates normally at room temperature. However, in the case of a high temperature or a large current, the TRPS will be activated, greatly increasing its resistance and shutting down the battery. The battery structure can thus be protected without damage. c, Thermal switching mechanism of the TRPS material. The polymer composite film has a high electrical conductivity at room temperature due to the quantum tunneling effect provided by spiky nanostructured nickel particles (GrNi). On heating, the polymer matrix expands, thus separating the conductive particles, which can decrease the value of σ by a factor of about $10^7$-$10^8$. On cooling, the polymer shrinks and regains the original conductive pathways. The symbol (×) illustrates blocking of electron or ion transport.

Safe battery design: An example LIB comprises a flammable organic electrolyte and electrode materials (often metal oxides), which are separated by a porous polyolefin separator with a melting point ($T_m$) of about 130 to about 160° C. Such a battery is typically operated under a large cell voltage (about 3.5-4.2 V) that exceeds the thermodynamic stability window. When a large amount of heat is generated by shorting or overcharging, the battery separator will melt, which triggers and accelerates exothermic reactions between two electrodes and the electrolyte, leading to the catastrophic thermal runaway (FIG. 2a). The disclosed safety concept is demonstrated in FIG. 2b. In this design, a TRPS layer is added to at least one of the current collectors (here the cathode is used as an example) to form a hybrid current collector. As further illustrated in FIG. 2c, the proposed TRPS film is based on a modified quantum tunneling composite (QTC) made from nanostructured metal particles with a graphene coating as the filler and a polymer with a high thermal expansion coefficient (for example, a semicrystalline polymer) as the matrix. The nanostructures on the surface of the metal particles are desired as high $\sigma$ can be obtained on this QTC-based TRPS film at normal operating temperatures (for example, <about 60° C.) owing to the enhanced electrical tunneling due to the nano-spikes. Such a tunneling effect can provide a much higher local electrical field at the nano-spikes than that at the surface of regular spherical particles, thus enhancing the conductive percolation. The TRPS film rapidly becomes insulating and shuts down the battery above its switching temperature ($T_s$) as a result of volume expansion of the polymer matrix that separates the conductive particles and breaks the conductive pathways. When the temperature cools to below $T_s$, the TRPS film contracts and recovers its high $\sigma$. Because the conductivity change of the TRPS film is reversible, the battery can be repeatedly shut down and revived.

An attractive feature of this approach is that the $T_s$ value of TRPS can be rationally designed to meet the specification of a desirable battery operating temperature by adjusting its composition. In practical battery modules, the TRPS can also be used to monitor the internal temperature of a battery and allow an external control system to take action to further protect batteries. Once the normal temperature is reached after intervention, the internal cell resistance returns to a small value and the battery can be operated again as usual. Such TRPS allows a fast and reversible shut-down of LIBs before dangerous events start, without structural damage to the battery or performance degradation.

Figure 3:
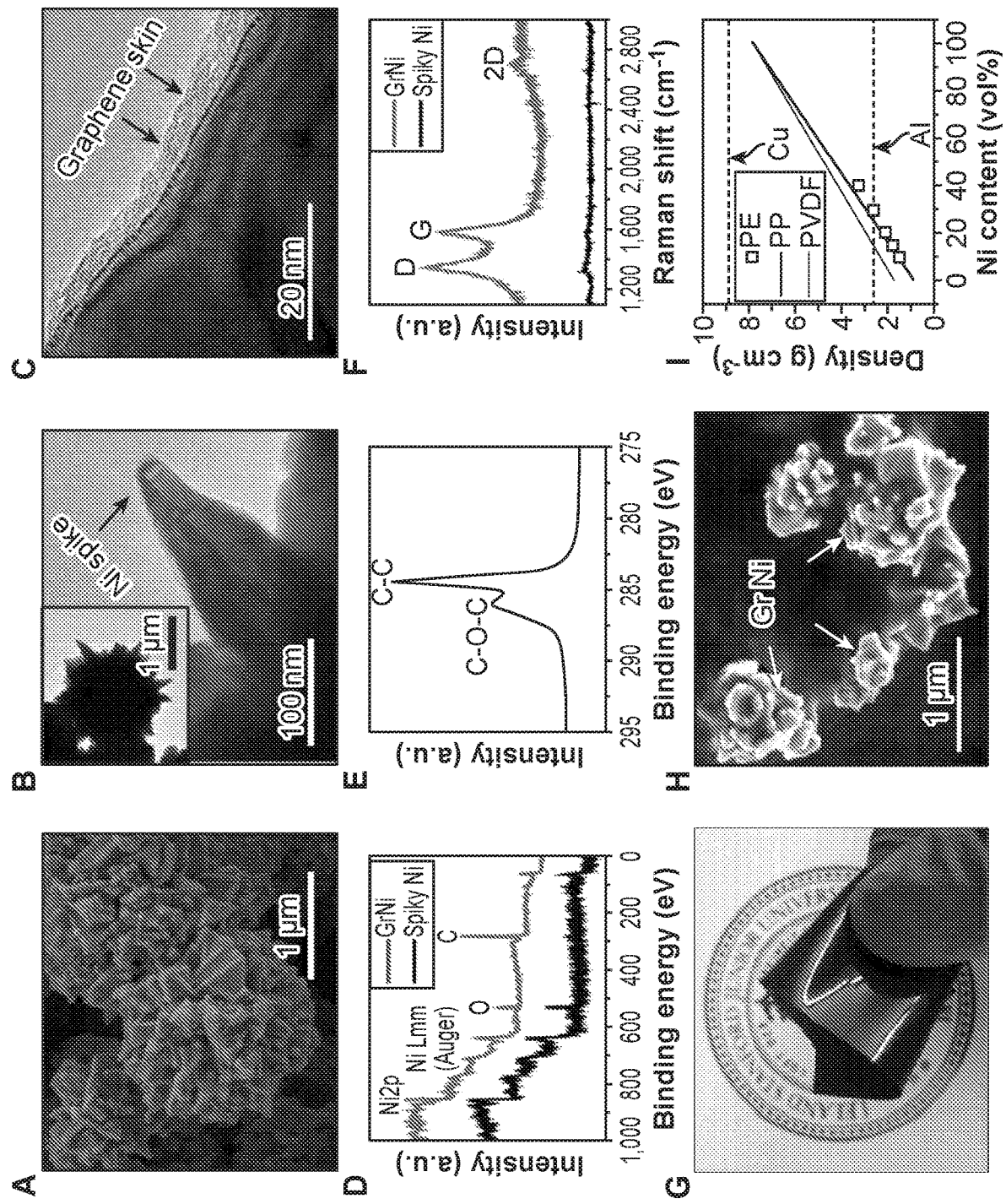
FIG. 3. Structure and composition of graphene-coated nano-spiky Ni and as-fabricated TRPS material. a, SEM image of GrNi particles. b, TEM image of a single Ni spike with a uniform graphene coating. The inset shows a GrNi particle with a typical nano-spiky structure. c, High-resolution TEM of the conformal graphene layer on GrNi with a thickness of about 5-10 nm. d, XPS spectra of original spiky Ni and GrNi. e, C1s XPS spectrum peak of GrNi, indicating the graphene coating. f, Raman spectra of original spiky Ni and GrNi. The intense G peak and clear 2D peak of GrNi confirm the excellent graphene coating. g, Digital photograph of a freestanding TRPS film based on polyethylene (PE)/GrNi with about 20 vol. % GrNi loading. h, SEM image of the PE/GrNi-based TRPS composite showing the GrNi network embedded in the PE matrix. i, Dependence of the TRPS composite density on the GrNi volume fraction for different polymer matrices, including PE, polypropylene (PP) and polyvinylidene fluoride (PVDF). Solid line, calculated density; squares, measured density. For comparison, the dashed straight horizontal lines indicate the densities of Cu and Al.
Figure 7:
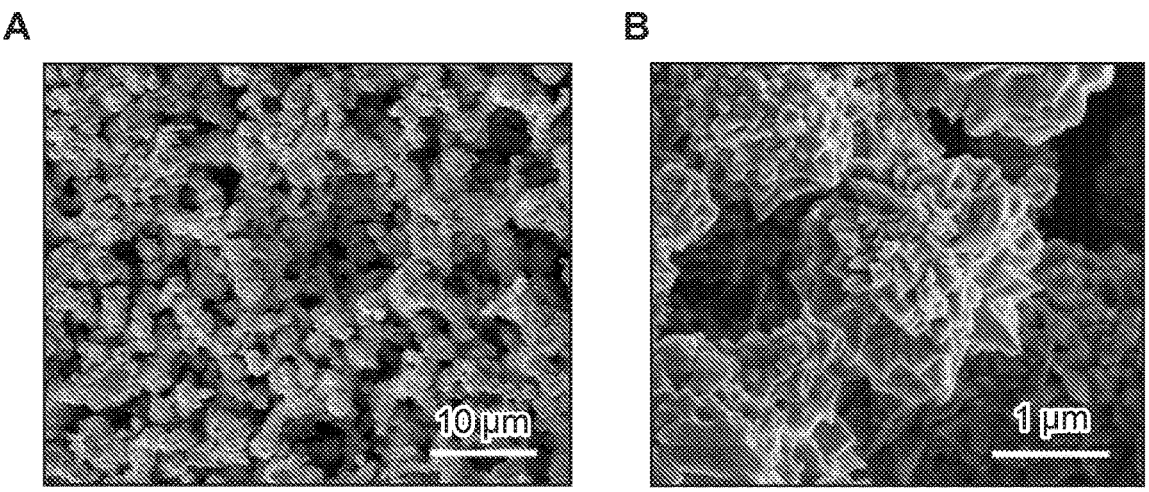
FIG. 7. Low (a) and high (b) magnification SEM images of native spiky Ni particles, which show nanoscale protrusions on the particle surface.

Materials fabrication and characterization: As a model system, graphene-coated nanostructured nickel (Ni) particles with spiky protrusions are used as the conductive filler, and polyethylene (PE) is used as the polymer matrix to form QTC-based TRPS composite. The spiky nanostructures of Ni particles are desired because they amplify the charge transport by a field-assisted tunneling effect and provide a high $\sigma$ at low volume fraction. However, Ni may be subject to electrochemical oxidation at high voltage (for example, >about 4 V versus Li/Li$^+$) and promotes electrolyte decomposition. To address this, graphene-coated nano-spiky Ni particles (GrNi) were synthesized (see Methods) to provide a stable Ni-electrolyte interface. Scanning electron microscopy (SEM, FIG. 3a) and transmission electron microscopy (TEM, FIG. 3b) images show that the GrNi particles maintain the spiky nanoscale surface features, similar to the native Ni (FIG. 7). The size of GrNi particles mainly ranges from about 1 µm to about 3 µm. A graphene skin is conformally formed on the surface of Ni with a typical thickness of about 5-10 nm (FIG. 3c). X-ray photoelectron spectroscopy (XPS) further confirms the coating of graphene on the surface from the intensive C1s peak (FIG. 3d, e). Raman spectroscopy (FIG. 3f) shows a sharp G peak (about 1,580 cm$^{-1}$) and a clear 2D peak (about 2,670 cm$^{-1}$), further confirming the excellent graphene coating. Such a dense graphene coating is desired to provide good electrochemical stability in battery cycling while maintaining a high electrical conductivity.

Figure 8:
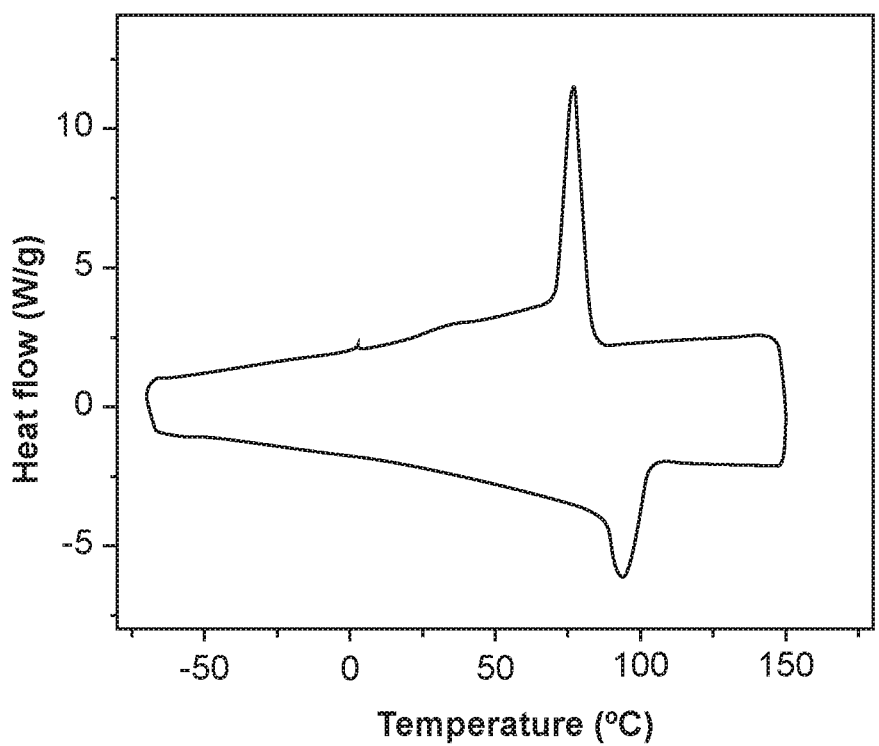
FIG. 8. DSC curve of pure low-density PE (LDPE). The melting point is measured to be about 95° C.
Figure 9:
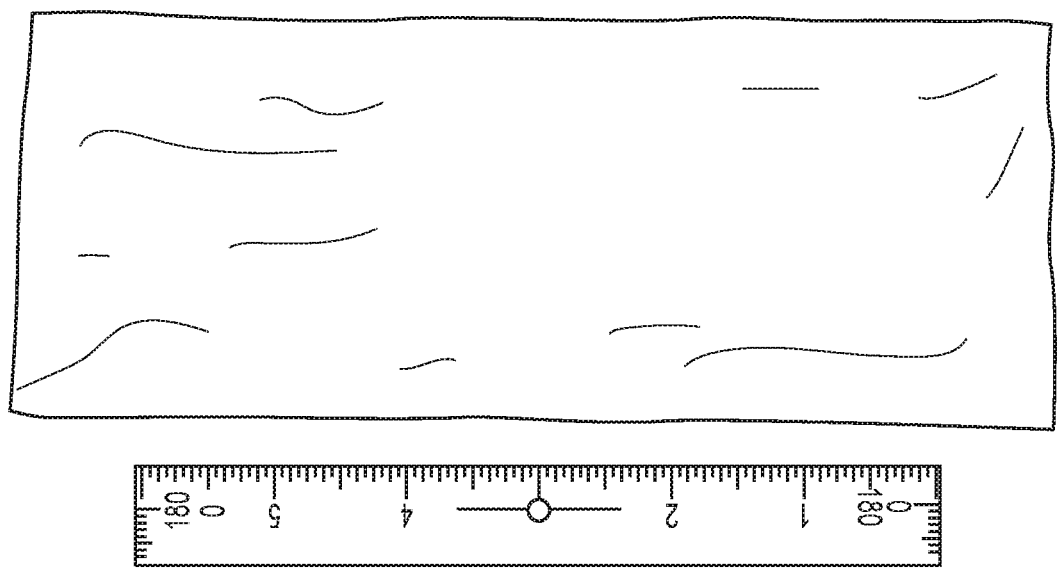
FIG. 9. An image of PE/GrNi-based TRPS coated on an Al foil. The film size is about 25 cm by 15 cm.

PE is selected as the matrix polymer as it is used in separators and is electrochemically stable in LIBs. Its high thermal expansion coefficient ($\alpha$ of about $10^{-4}$ K$^{-1}$) is desired to realize a fast response to temperature change. Here, low-density PE (LDPE) is used because its melting temperature ($T_m$) (FIG. 8) is lower than that of high-density PE used for LIB separators. This will allow the battery to shut down before the temperature becomes high enough to damage the separator. Other polymers, such as polypropylene (PP) or polyvinylidene fluoride (PVDF), are also suitable for the design, potentially providing different $T_s$. QTC-based TRPS current collectors were then fabricated by uniformly blending the GrNi with molten PE and casting a homogeneous thin film (about 20 µm or less) on copper (Cu), aluminum (Al) or other substrates (FIG. 9).

Freestanding TRPS films can be readily obtained by carefully peeling off from a non-adhesive substrate (for example, glass). FIG. 3g shows an example of a PE/GrNi film (about 20 vol. % of Ni) under folding and twisting, indicating its excellent mechanical flexibility. The SEM image (FIG. 3h) clearly reveals the spiky GrNi particle network embedded in the PE matrix, forming conductive pathways. Owing to the intrinsic low density of PE ($\rho_{PE}$ of about 0.93 g cm$^{-3}$), the measured bulk density of PE/GrNi remains low even with a large fraction of GrNi, for example, about 2.9 g cm$^{-3}$ at about 20 vol. % of GrNi (FIG. 3i). Such a density is close to Al (about 2.7 g cm$^{-3}$) and much lower than Cu (about 8.96 g cm$^{-3}$), thus making it desirable for lightweight electrode applications.

Figure 4:
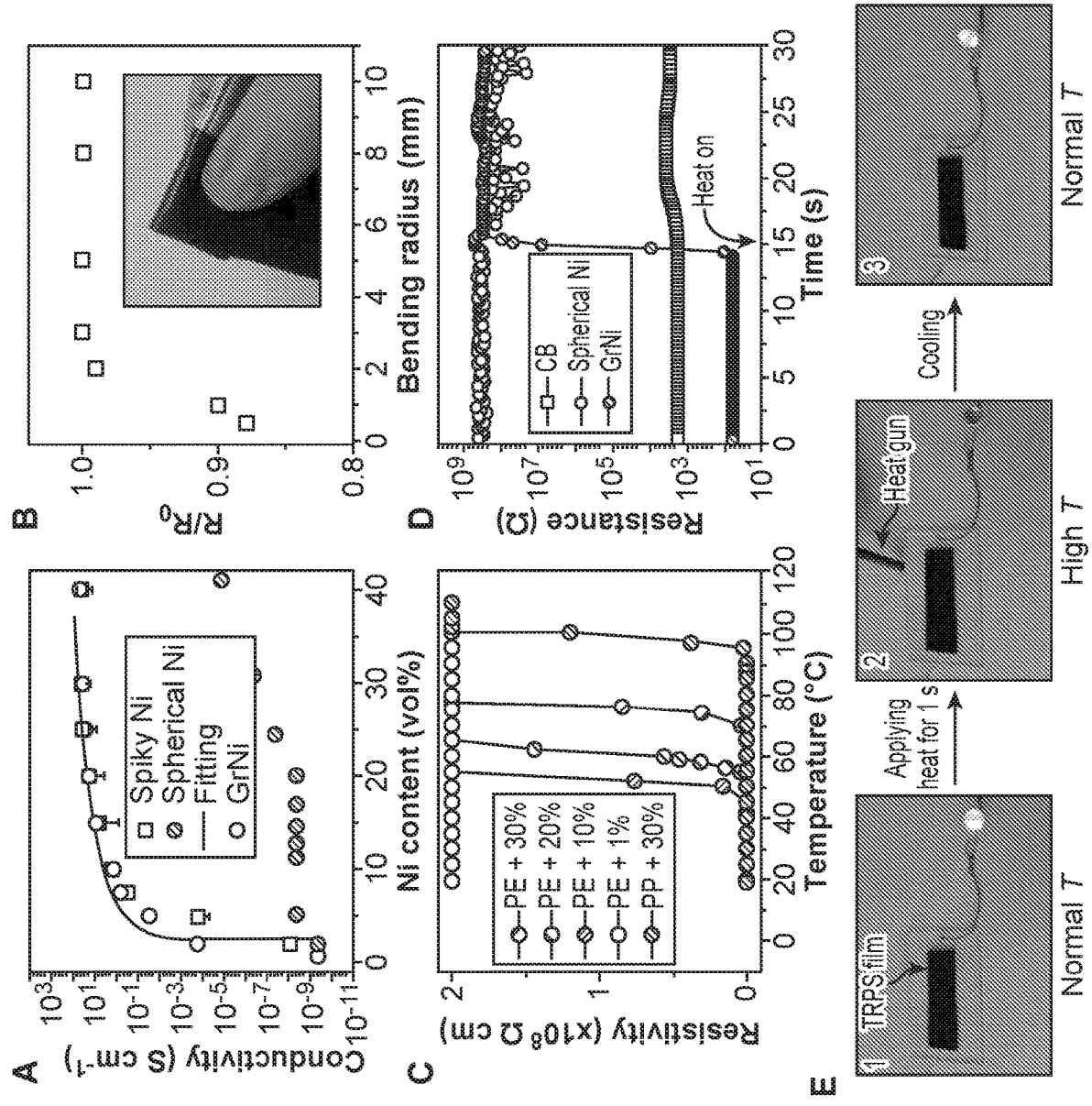
FIG. 4. Physical properties of TRPS film. a, TRPS film conductivity as a function of the volume fraction for different conductive particle fillers (spiky Ni, GrNi and spherical Ni). Error bars represent the standard deviation from five samples per volume fraction. The dashed curve represents the best-fit line for conductivity above the percolation threshold using percolation theory. b, Dependence of the relative resistance of a freestanding TRPS film (about 50 μm) on its bending radius. Inset shows the TRPS film rolled on a glass tube with a diameter of about 4 mm. c, Resistivity changes of different TRPS films as a function of temperature, including PE/GrNi with different GrNi loadings and PP/GrNi with about 30 vol. % loading of GrNi. The resistivity of PE/GrNi with about 1 vol. % loading of GrNi remained large at about 20-90° C. owing to an insufficient number of conductive pathways. d, Dependence of resistance on time for PE-based composites with different conductive fillers on heating. The resistance of PE/GrNi increased by about $10^8$ in <about 1 s. e, Demonstration of thermal switching behavior of a TRPS film using a light-emitting diode (LED) connected in a circuit.
Figure 10:
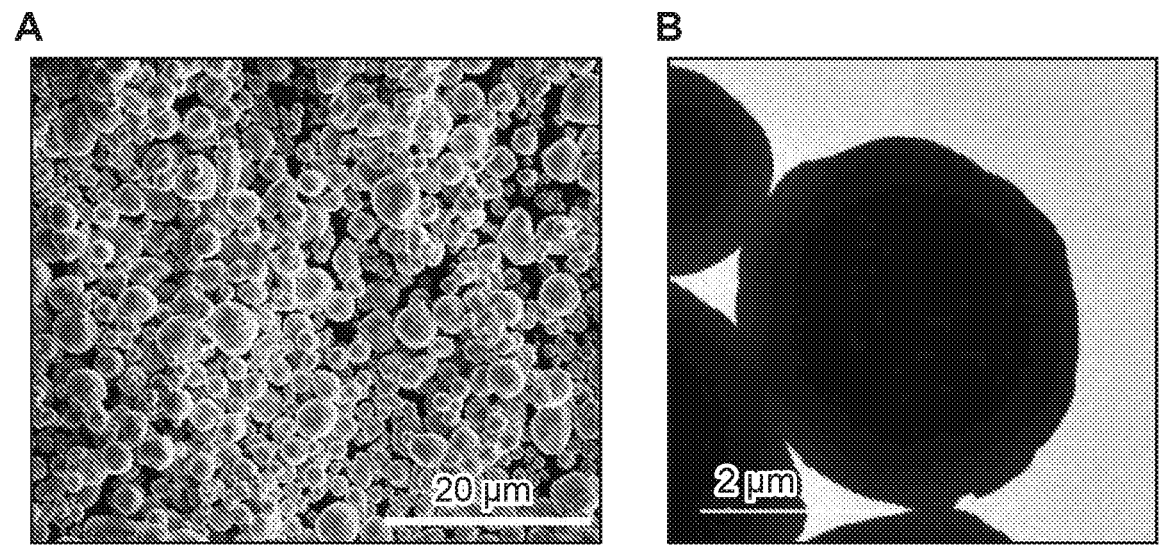
FIG. 10. SEM (a) and TEM (b) images of spherical Ni particles with featureless surface.

The PE/GrNi-based TRPS composites show a high $\alpha$ with a relatively low loading of GrNi particles. As shown in FIG. 4a, the dependence of conductivity on Ni volume fraction follows the percolation theory, with a percolation threshold of about 0.02. The value of $\alpha$ can reach as high as about 50 S cm$^{-1}$ at a 40 vol. % GrNi loading. The $\alpha$ values of CB-based PTC composites are typically in the range from 0.01 to 1 S cm$^{-1}$, significantly lower than the TRPS composites. Composites made from native spiky Ni can reach similar conductivities at high Ni loadings yet the percolation threshold (about 0.05) is slightly higher than PE/GrNi. This might be due to improved dispersion and reduced aggregation of GrNi in the nonpolar PE at low volume fraction due to the graphene coating. By comparison, using smooth spherical Ni particles (FIG. 10) as the conductive filler yields composites showing very low $\sigma$ even with a high Ni loading, confirming the important role of spiky nanostructures on the Ni surface. The $\sigma$ of the PE/GrNi film remains stable at a normal bending radius, which further confirms its excellent mechanical properties (FIG. 4b); $\sigma$ is reduced by about 10% as the bending radius decreases to about 0.5 mm, possibly owing to the deformation of the PE matrix, which slightly varies the local particle-to-particle distances.

The $\sigma$ of PE/GrNi changes rapidly as the temperature approaches $T_s$. FIG. 4c shows the resistivity dependence on temperature for different TRPS films. Taking PE/GrNi with about 30 vol. % of GrNi as an example, the resistivity increases by about 8 orders of magnitude as the temperature steadily goes from 20 to 80° C. This corresponds to a rate of change of resistivity of about 4×10$^7$ $\Omega$cm ° C.$^{-1}$ at $T_s$ (about 65-70° C.). Such a resistivity change is about 10$^3$-10$^4$ times higher than PTC composites for LIB, such as poly(methyl methacrylate) (PMMA)/CB, PE/CB and epoxy/CB. The large resistance change of TRPS films can be attributed to the quantum tunneling effect between spiky GrNi particles associated with the volume expansion of PE below the $T_m$.

Figure 11:
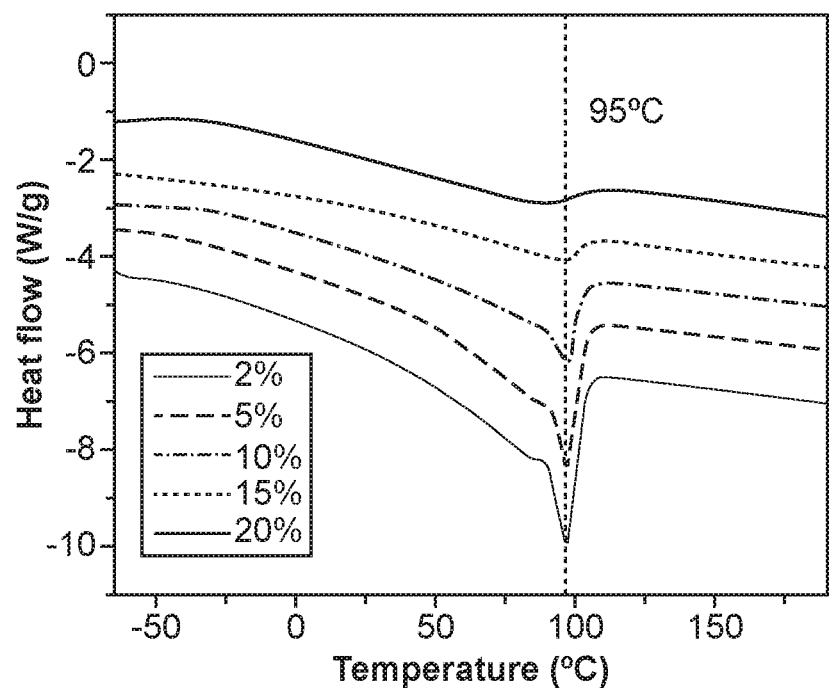
FIG. 11. DSC plots of PE/GrNi-based TRPS films at different volume ratios of GrNi particles. All different samples have melting points at about 95° C., which is similar to the pure LDPE.
Figure 12:
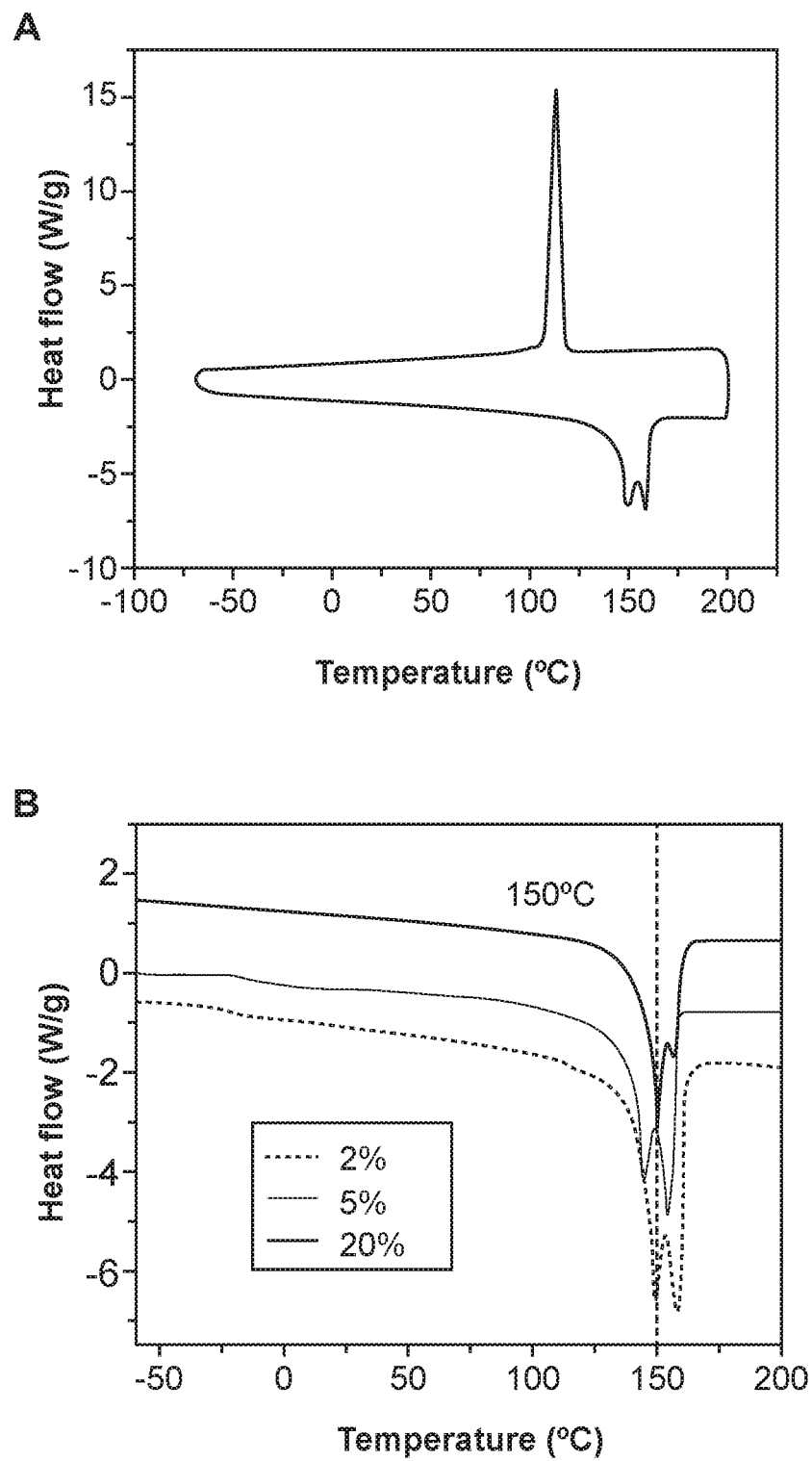
FIG. 12. DSC plots of pure PP and PP/GrNi-based TRPS. All different samples have melting points at about 150° C.

The $T_s$ of different PE/GrNi compositions can be tuned by adjusting their ratios. For example, the $T_s$ of PE/GrNi with about 20 and about 10 vol. % of GrNi decreased to about 58 and about 50° C., respectively. Differential scanning calorimetry (DSC) measurements (FIG. 11) show that the $T_m$ of PE/GrNi remains similar (about 95° C.) for different compositions, thus confirming that the change of $\sigma$ is due to the nonlinear volume expansion of PE below $T_m$. Similarly, the $T_s$ can be further enhanced using polymers with higher $T_m$, such as PP at about 150° C. (FIG. 12) and PVDF at about 170° C. (FIG. 13). By choosing different polymers, and further controlling their ratio, the $T_s$ of TRPS films can be tuned over a wide range of temperatures to meet various applications.

The thermally induced switching of the TRPS film is very fast and highly reversible. As shown in FIG. 4d, on directly heating to about 80° C., the resistance of a PE/GrNi (about 20 vol. % of GrNi) film increased from about 2 to about 10$^8\Omega$ in less than about 1 s. When the film was cooled to about 25° C., the resistance decreased back to between about 2 and about 5$\Omega$. This thermal switching behavior is reversible over repeated heating and cooling cycles. After 20 switching cycles, the polymer film still retained good conductivity at room temperature and showed high resistivity at high temperature (FIG. 14). By comparison, the resistance of a PE/CB film with the same composition increased from about 2,000 to just about 5,000$\Omega$ in about 5 s at the same heating condition. FIG. 4e further demonstrates the efficient thermal switching behavior of PE/GrNi. A light-emitting diode (LED) was connected to a TRPS film in a circuit and lights up at room temperature. The LED is shut off soon after applying heat with a hot air gun. After removal of the hot air gun, the polymer film cooled down and LED lit up again. The shut-down response time is less than about 1 s on applying the heat source, confirming an ultrafast switching behavior. Such a fast response is especially important for battery safety control.

Safe battery performance and switching behavior: To demonstrate the function of TRPS film in batteries, TRPS film-coated current collectors are used (FIG. 5a). For example, a PE/GrNi (about 20 vol. % GrNi) film with a thickness of about 15 µm was coated on an about 20 µm Al foil (FIG. 5b). Because the film can be readily sliced, a typical electrode fabrication process can be readily used. LiCoO$_2$ was then coated onto the TRPS current collector as working electrodes to assemble batteries using lithium as the anode (FIG. 5c). Cyclic voltammetry curves of TRPS film made from native spiky Ni showed large oxidation and reduction (mainly due to the surface oxide layer) currents from side reactions (FIG. 5d). By comparison, PE/GrNi showed negligible current from about 0.01 to about 4.7 V (versus Li/Li$^+$), indicating the excellent electrochemical stability provided by the graphene coating. Full cells made from LiCoO$_2$ and graphite using GrNi-based TRPS film show much higher Coulombic efficiency and cycling stability than those using native Ni particles, further confirming the importance of the graphene coating (FIG. 15). The TRPS film resulted in a slightly increased Ohmic resistance in the safe batteries compared with the normal ones (FIG. 5e). Nevertheless, the total cell equivalent series resistance (ESR) decreased slightly, possibly owing to improved electrochemical contact on the electrodes and interfaces with the elastic TRPS layer.

Such batteries can be operated in a similar way to normal batteries without sacrificing electrochemical performance. As shown in FIG. 5f, at room temperature no clear difference was observed between safe and normal batteries in the galvanostatic charge/discharge cycling, indicating good electrochemical stability of the safe batteries (FIG. 16). The rate capability of safe batteries is slightly better than normal batteries (FIG. 17), which is consistent with the electrochemical impedance spectrum (EIS) measurements. Similarly, safe cells based on graphite anodes also showed similar cycling performance to those of normal cells at room temperature, further indicating good electrochemical stability at a low potential (FIG. 18). Moreover, the safe batteries can be operated stably at moderate temperature (about 20-50° C.). To better evaluate the intrinsic thermal stability of TRPS film, $LiFePO_4$ is used as the active material to perform cycling at about 50° C. As shown in FIG. 19, the safe battery with TRPS film can be cycled with similar stability to that of a normal battery, indicating its good thermal tolerance. These results indicate that the TRPS film is highly compatible with LIB chemistry and meets the specifications for practical battery operation.

Batteries with TRPS film respond rapidly to overheating. As shown in FIG. 5g, a safe $LiCoO_2$ battery was initially cycled stably at about 25° C.; once the temperature was increased to about 70° C., it rapidly shuts down owing to the rapid increase of the ESR (FIG. 20). After cooling to about 25° C., the battery can resume normal cycling starting from the previous shut-down potential. The retention of an open-circuit potential indicates a negligible leakage current after shut-down. This thermal switching process can be reproduced multiple times on the same battery (FIG. 21). As summarized in FIG. 5h, the safe battery delivered a stable capacity at room temperature, with little degradation during cycling, whereas the cycling capacity dropped to almost zero at high temperature, further indicating a highly reversible shut-down process. Similar thermal switching behavior was also observed for safe graphite batteries (FIG. 22), on which repeated shut-down and recovery can also be realized. Considering that the volume expansion of various PE in the temperature range of about 0-80° C. is <about 10%, the thickness of a TRPS film is about 15 μm, and the overall thickness of a single-cell battery is >about 100 μm, the total thickness change of the TRPS film (<about 1.5 μm) has little effect on the whole battery structure, thus ensuring stable operation during repeated thermal cycling.

Mechanistic understanding: The most common reasons causing battery thermal runaway are overheating and shorting. The above results have shown the efficacy of a TRPS film towards protecting battery overheating. Internal PTC devices using CB as the conductive filler can result in an about $10^2$ times higher initial resistance than graphene-coated spiky Ni-based TRPS composite. This will invariably compromise the battery performance under normal operating conditions. The PTC devices also can show a significant leakage current due to the much smaller resistivity increase ($10^2$-$10^4$ versus about $10^8$ times) than the TRPS film at $T_s$, meaning that the PTC devices cannot fully shut down a failing battery. The surface-stabilized nano-spiky Ni particle filler endows the TRPS film with a high conductivity at low temperature, a high tolerance to electrochemical oxidation, a large resistance increase at $T_s$, and a short response time (<about 1 s) to shut down failing batteries.

Figure 6:
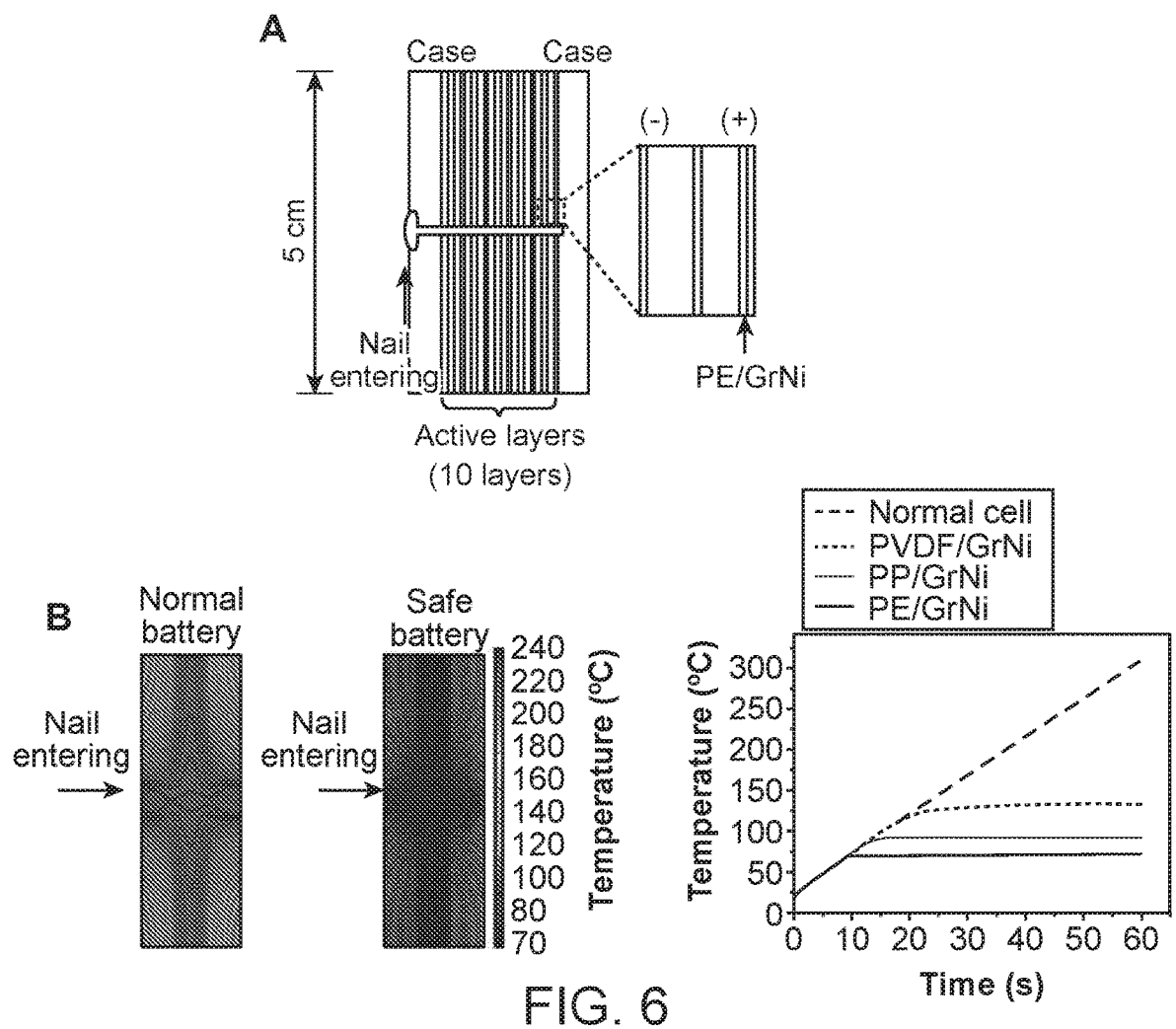
FIG. 6. COMSOL simulation of battery behavior after nail shorting. a, Schematic illustration of the battery structure used for thermal modelling. The nail is placed in the center of the case. For the normal cell, the current collectors are Al (cathode) and Cu (anode). For the safe battery, the current collector is TRPS film-coated Al or Cu. b, Two-dimensional temperature profiles on the cross-section of normal and safe batteries after shorting for about 30 s. The arrows show the position of the nail on each cell. c, Battery temperature dependence on shorting time. The normal battery and the safe batteries show significantly different thermal behavior.

Simulation of a battery thermal behavior with a capacity of about 2,000 mAh indicates that shorting-induced thermal runaway can be prevented by the TRPS film. To further understand the thermal switching, a COMSOL simulation is performed to monitor the change of battery temperature on nail shorting (see Methods). As shown in FIG. 6a, a battery with ten laminates is shorted by a nail from the center of the case. Batteries with and without a TRPS current collector show markedly different thermal behaviors (FIG. 6b).

For normal batteries, nail shorting can lead to fast electrochemical reactions and generate a large amount of heat that can increase the battery temperature rapidly. As shown in FIG. 6b, c, the internal temperature of a normal LIB can increase to above about 300° C. in about 60 s. This is close to in operando observation of thermal runaway in real batteries using high-speed tomography. In the safe batteries, besides electrochemical reactions, a large current passing through the TRPS film under shorting can also increase the temperature through Joule heating, which can quickly activate the thermal switching and shut down the current flow. This will terminate the battery reactions and prevent thermal runaway. By applying the dependence of resistance on temperature (FIG. 4c and FIG. 13), batteries with different TRPS films show similar thermal responsive behavior (FIG. 6b, c). The temperature of all the safe batteries increased to their $T_s$ and remained stable owing to shut-down. For example, the PE/GrNi-based safe battery reaches a maximum temperature of about 70° C. on shorting before it automatically shuts down. Although the simulation is based on simplified conditions, the trend and significantly different thermal behavior between normal batteries and safe batteries indicate the suitability of using designed TRPS films to control battery safety under various failure conditions.

It is also noted that, with the increased size and thickness of a battery, the external heat propagation into the battery may not be fast enough to instantaneously trigger the shut-down with TRPS, and an ionic current could still flow. To develop even more effective TRPS for battery safety management, TRPS composites with very high thermal conductivity can be used. In addition, optimized cell structures that can accommodate the TRPS composite so as to respond to external stimuli more rapidly can also be designed.

Conclusion: A class of ultrafast, reversible TRPS materials is developed for safer batteries. The TRPS material is attained by the use of graphene-coated nano-spiky Ni particles, which provide high σ at low particle fraction, high thermal sensitivity, and excellent electrochemical stability. The TRPS material shows excellent mechanical flexibility, a high room temperature σ, a large operating voltage window, ultrafast thermal switching and a large decrease of σ on heating. Safe batteries with this TRPS material show excellent battery performance at normal temperature and shut down rapidly under abnormal conditions, such as overheating and shorting. The batteries can also resume normal function without compromising performance after intervention and repeated use. The design provides a reliable, fast, reversible strategy that can achieve both high battery performance and improved safety.

Methods

Synthesis of graphene-coated spiky Ni (GrNi). To form GrNi, about 5 g of spiky Ni particles (Novamet) were dispersed in about 150 ml of triethylene glycol (TEG, Sigma Aldrich) and about 500 μl of about 50% w/w aqueous NaOH solution. After stirring at about 185° C. for about 8 h, the spiky Ni was collected by centrifugation and washed three times with ethanol. The NaOH solution facilitates decomposition of the organic solvent (TEG), allowing carbon atoms to diffuse into the Ni layer and adhere to the surface. This primes the spiky Ni for low-temperature graphene growth. Samples were then dried in a vacuum oven at about 50° C. for about 1 h. The dried particles were placed in a tube furnace with the following temperature profile: heating to about 100° C. at about 2° C. min$^{-1}$; heating to about 600° C. at about 20° C. min$^{-1}$; holding temperature at about 600° C. for about 1 h. An Ar flow rate of about 80 sccm was maintained throughout the ambient pressure annealing process.

Preparation of QTC switching polymer. The QTC-based TRPS films were formed by first mixing GrNi or native spiky Ni particles with polymers (for example, PE, PP) at different ratios under melting and then coating the mixture onto a substrate (for example, Al, Cu or glass). The PVDF-based TRPS film was formed by dissolving PVDF in N-methyl-2-pyrrolidone (NMP) and dispersing Ni particles into the viscous polymer solution for film coating. Free-standing TRPS films were made by peeling off the coating layer from the glass substrate.

Battery fabrication and testing. Safe batteries were fabricated using TRPS layer-coated Cu or Al film as the current collector. Cathode slurry was prepared by mixing active materials (LiCoO$_2$ or LiFePO$_4$), carbon black (CB) and PVDF at a mass ratio of about 8:1:1 with NMP as the solvent. Anode slurry was prepared by mixing graphite, CB and PVDF at a mass ratio of about 90:5:5. The working electrodes were fabricated by coating different slurries on various current collectors and dried in vacuum at about 80° C. for about 10 h. Half-cells were fabricated by sandwiching a working electrode, a separator (25 µm Celgard 2500) and a lithium disc. Full cells were made using a LiCoO$_2$ electrode (with or without TRPS films) as the cathode and a graphite electrode as the anode. The electrolyte was about 1 M LiPF$_6$ in ethylene carbonate/diethylcarbonate (about 1:1 v/v). Cyclic voltammetry and EIS measurements were performed on a VMP3 potentiostat (Bio-Logic). Galvanostatic charge/discharge cycling was performed on BT 2000 test station (Arbin Instrument).

Thermal measurement. The room-temperature electrical conductivity was measured by the four-point probe method with a Keithley 4200. The PTC effect of various composites was tested using the two-terminal method by ramping and cooling samples in a temperature-controlled environmental chamber (ESPEC, model BTU-133), in which a digital multimeter (Amprobe CR50A) was connected to the samples. The safe battery cycling and switching test was also performed in the temperature chamber, with a temperature ramping rate of about 2° C. min$^{-1}$. To measure the instantaneous thermal response of the polymer to heating, a hot air gun (X-Tronic 4000) set at about 157° C. was used to heat the TRPS film by blowing hot air. This allows the TRPS film temperature to reach about 80° C. rapidly. The resistance change versus time was recorded by a precision LCR meter (Agilent E4980A).

COMSOL simulation. The internal-shorting-induced Joule heating behavior of batteries was simulated by COMSOL Multiphysics 3.5a, using two-dimensional transient analysis of Heat Transfer and AC/DC modules. One normal cell contains a Cu foil, a graphite electrode, a separator, a LiCoO$_2$ electrode, and an Al foil. The battery is composed of ten unit cells sandwiched by acrylonitrile butadiene styrene (ABS) resin, and the center is penetrated by a stainless steel nail. The safe batteries contain TRPS-coated current collectors. The battery is prismatic-type and has a total area of about 500 cm$^2$ and a capacity of about 2,000 mAh. Note that the simulation model does not contain the entire battery, but the size is large enough to demonstrate the thermal behavior without losing generality. The Cu foil is grounded and the Al foil has an applied voltage of about 3.7 V. The ambient air temperature is set as about 20° C. and the heat transfer coefficient of the ABS-air interface is about 10 Wm$^{-2}$ K$^{-1}$. The top and bottom boundaries are thermally insulated. When the battery is punctured by a steel nail, the positive and negative electrodes are shorted and inject all their current into the nail. The heating of the battery originates from the metal foils, the steel nail, and the internal resistance, which is evenly distributed among the graphite electrode, the separators and the LiCoO$_2$ electrodes. The internal resistance is assumed to be about 0.075Ω, and the ionic resistivity can be calculated to be about 30 Ωm$^{-1}$, using the total area of the battery and the thickness of electrodes and separators. Physical properties of the materials are listed in Table 1. For the time evolution of battery temperature, the probe position is located about 1 mm above the steel nail along the center line.

TABLE 1

Parameters used for thermal simulation.

| Material | Density (kg/m$^3$) | Electrical resistivity (W * m) | Thermal conductivity (W/(m * K)) | Heat capacity (J/(kg * K)) | Temperature coefficient of resistance (K$^{-1}$) (T$_{ref}$ = 20° C.) | Ionic resistiviy (W * m) |
|---|---|---|---|---|---|---|
| Cu foil | 8933 | 1.72 × 10$^{-8}$ | 398 | 385 | 0.00393 | ** |
| Graphite electrode | 1347.33 | ** | 1.04 | 1437.5 | ** | 30 |
| Separator | 1008.98 | 1 × 10$^{10}$ | 0.3344 | 1978.16 | ** | 30 |
| LiCoO$_2$ electrode | 2328.5 | ** | 1.58 | 1269.21 | ** | 30 |
| Al foil | 2702 | 2.82 × 10$^{-8}$ | 238 | 903 | 0.0039 | ** |
| Stainless steel | 8000 | 3 × 10$^{-6}$ | 16 | 500 | 0.00094 | ** |
| ABS resin | 1080 | 1 × 10$^{13}$ | 2.34 | 1424 | ** | ** |

** Not used in simulation

Example 2

Characterization and Understanding of Thermoresponsive Polymer Composites Based on Spiky Nanostructured Fillers Overview: Conductive polymer composites based on nanostructured particulate fillers have various applications, such as temperature and pressure sensors. Amongst various factors, the microstructure of a conductive particle network determines the electron conduction properties. When nano-spiky Ni particles are used in a polymer matrix, a reversible and rapid response and a large change of conductivity can be obtained for the composite upon temperature change. It is hypothesized that quantum tunneling plays an important role. Here, impedance spectroscopy and low temperature electrical measurements are used to reveal the charge transport mechanisms of nano-spiky Ni-based nanocomposites upon temperature change. The results show that quantum tunneling effects indeed play a major role, which affords significant inter-particle resistance change upon slight change (expansion and contraction) of the micro-structured particle network.

Introduction: Polymer-based conductive composites are desirable due to their high tunability of functionality. By selecting polymer matrices and conductive additives, desirable mechanical, electrical, chemical and thermal properties can be achieved, which are suitable for a broad range of applications such as thermistor (positive temperature coefficient or PTC components), resettable fuses, as well as pressure and temperature sensors. Particularly, there is a growing demand for less complex yet high-performance temperature sensors that can be readily integrated into flexible, stretchable device systems (e.g., wearable electronics, robotics, and so forth), while typical sensors based on metals and semiconductors are rigid and fragile, thus failing in these emerging applications.

To achieve the aforementioned properties, an aspect is to design high-performance thermoresponsive polymer composites by understanding the charge transport behavior under operation conditions. Thermoresponsive composites are generally based on the effect of positive temperature coefficient (PTC) of the polymer matrix, which undergoes significant volume expansion near its melting point. This process leads to an increased inter-particle distance between the conducting particles in the composite, and the corresponding electrical resistivity. A desirable thermoresponsive polymer composite should possess the following properties: i) the polymer matrix and conductive filler should be chemically and thermally stable; ii) the polymer has a high thermal expansion coefficient and high resistivity in the desired temperature range; iii) the conductive filler has a low thermal expansion coefficient and high electrical conductivity.

Based on such criteria, a class of thermoresponsive polymer composites is developed by combining semi-crystalline polymer matrixes (polyethylene or PE, polyethylene oxide or PEO) and spiky nanostructured metal (Ni) particles, which results in very rapid and reversible temperature sensing properties in a broad range of temperatures through composition and structure tuning. Especially, the sensitivity (change of electrical conductivity upon temperature change) of the thermoresponsive composites (Ni/PE) is significantly higher (by about $10^3$ to about $10^4$ times) than other polymer composites using a polymer matrix and different conductive particles (carbon black or CB). A desirable feature of the composite system is that the highly conductive Ni particles have nanometer-scale protrusions on the surface. However, in spite of their intriguing sensing properties during thermal switching, the fundamental charge transport process in such nanocomposites remains to be understood. It is hypothesized that quantum tunneling plays an important role. In this example, impedance spectroscopy is used to systematically evaluate the electrical conduction behavior and disclose the charge transport mechanism in the Ni/PE model system near its conduction percolation region. The results show that Ni particles with nano-spiky surface feature provide Ni/PE composites with a relatively low conductive percolation threshold, high electrical conductivity above the percolation, and sensitive pyroresistivity. More importantly, it is found that the quantum tunneling effects play an important role, which afford significant inter-particle resistance changes upon slight change of the microstructure of a particle network. This finding can guide the design of thermoresponsive materials for broader applications.

Percolation threshold of composites: The conductivity of composites can be approximated at low loading values of granular conductive fillers using a percolation power-law dependency in the form as shown below:

$$\sigma = \sigma_0 (\varphi - \varphi_C)^t \quad (1)$$

where $\sigma_0$ is a constant of proportionality (upper threshold for maximum conductivity at 100% loading), $\varphi$ is the volume fraction of the conducting filler in the composite, $\varphi_C$ is the critical volume fraction above which percolation can occur, and t is the transport exponent accounting for the dimensionality of the charge transport. In other words, this relation indicates that at very low volume fraction of conductive particles, the electrical properties of the composite basically approach the bulk conductivity of the insulating matrix leading to a 0-D material (t=0). With increasing concentration of conducting fillers, the dimensionality of the charge transport increases and so does the exponent t. Theoretical simulations exhibit exponents t=1.30±0.01 and t=2.26±0.04 for 2D and 3D systems respectively.

Among various conducting fillers, CB can be used for the preparation of thermoresponsive composite based on PTC mechanism. Depending on particle size and polymer matrix properties, typical values for CB-based nanocomposites are $\varphi_C$=0.05-0.3 and t=1.7-2.2. With changing the size, shape and structure of the conductive filler, the electrical conductivity and charge transport properties of the composites can vary significantly. One major drawback of CB is the relatively low intrinsic electrical conductivity ($\sigma_{CB}$<about 10 S/cm), which leads to low conductivity of the final composites. Additionally, a large volume percentage is included to reach a good conductivity with its composites, which sometimes decreases the mechanical flexibility of the material.

On the other hand, metal particle-based conductive fillers, such as Ni, have significantly higher intrinsic electrical conductivity ($\sigma_{Ni}$=about $1.43 \times 10^5$ S/cm), accordingly providing composites with high conductivity. The low thermal expansion coefficient of Ni ($\alpha$=13 μm/(m K)) ensures its structure stability during temperature fluctuation. In this example, nano-spiky Ni particles are selected as conductive filler to form composites and evaluation is made of their charge transport properties. PE was chosen as the polymeric matrix material due to its low electrical conductivity ($\sigma_{PE}$=about $10^{-15}$ S/cm) and high thermal expansion coefficient ($\alpha$=about 200 μm/(m K)). This combination endows high conductivity, and fast and reversible thermoresponsive features which are not achieved in the CB/PE composites.

Particularly, the unusual charge transport properties in the nano-spiky Ni/PE network during thermal fluctuation will be described.

To understand the electrical conduction property, preparation is made of a series of Ni/PE composites by varying the volume ratio of Ni particles in the composites, and measurement is made of their conductivity using four-point probe under ambient pressure at room temperature. By comparison, CB has also been used as a reference filler material. As described by percolation theory, the conductivity increases according to a power-law upon increasing the volume fraction of filler particles. Similarly, the electrical conductivity of Ni/PE composites increased rapidly once reaching a critical volume fraction (FIG. 23). Fitting parameters according to equation (1) gives $\sigma_0$ of about 12.12 S/cm and a critical volume concentration for the formation of percolation conduction at $\varphi_C$=about 2.55%. Even though the critical exponent t of electrical percolation is generally not related in a simple way to the fractal dimension $d_f$ of a system, it still reveals important information about the dimensionality of the charge transport. Importantly, the Ni/PE nanocomposite system exhibits a low critical exponent of t=about 1.04, indicating electronic charge transport close to 1D system. This is different from CB-based nanocomposites, where t is generally larger showing 2D or 3D systems. Particular evaluation is made of the region near the conduction percolation, where the electrical conduction is more sensitive to the microstructure change in the composite.

High sensitivity due to quantum-tunneling effects: It is hypothesized that the underlying conduction mechanisms for thermoresponsive composites based on PTC are attributed not just to classical ohms conduction in the percolation region, but also importantly to a tunneling effect where the conductive percolation pathways through the polymer matrix are interrupted but electrons can still pass between particles if their distance is in the range of a few nm. This tunneling effect is considered as a quantum mechanical process in which the wave function of an electron is not confined in a potential box so that a small tail extends beyond the potential barrier. The effect also results in amplified electrical field between adjacent particles with the nanoscale protrusions on their surface due to charge transport occurring by this field-assisted tunneling in nanometer-scale distance. These are the features of how quantum tunneling composites (QTCs) are applicable for sensing applications. As the composition varies and polymer volume changes with temperature fluctuation, the microstructural change of a particle network strongly affects the charge transport process. In the following discussion, evaluation is largely focused on the effect of temperature-dependent structural change on the conduction behavior of such systems by impedance spectroscopy.

Generally, in a composite with a certain volume fraction of conductive particles, the total electrical resistance is a combination of a series of resistors and capacitors. In a unit system of two adjacent particles, the overall impedance can be attributed to intra-cluster resistance (ohmic, $R_{intra}$), inter-grain resistance (contact, $R_{inter}$) and a capacitance ($C_{inter}$) in parallel with $R_{inter}$. Therefore, considering the microscopic level of the Ni/PE composites in the case of the percolation region at room temperature, electronic charge transport will take place through Ni clusters with high electrical conductivity. If the volume fraction of Ni is lower than the $\varphi_C$, it will gradually transform into a hopping transport mechanism between Ni clusters which is mostly constrained by inter-grain capacitances and resistances. Similarly, as temperature increases, the polymer matrix expands its volume, the gap between the adjacent Ni particles increases, and so that similar hopping transport will occur. This idea can be translated to a macroscopic level of electrical properties by looking at an average intra-cluster resistance connected in series to a parallel pair of inter-grain resistance and inter-grain capacitance (FIG. 24).

Figure 25B:
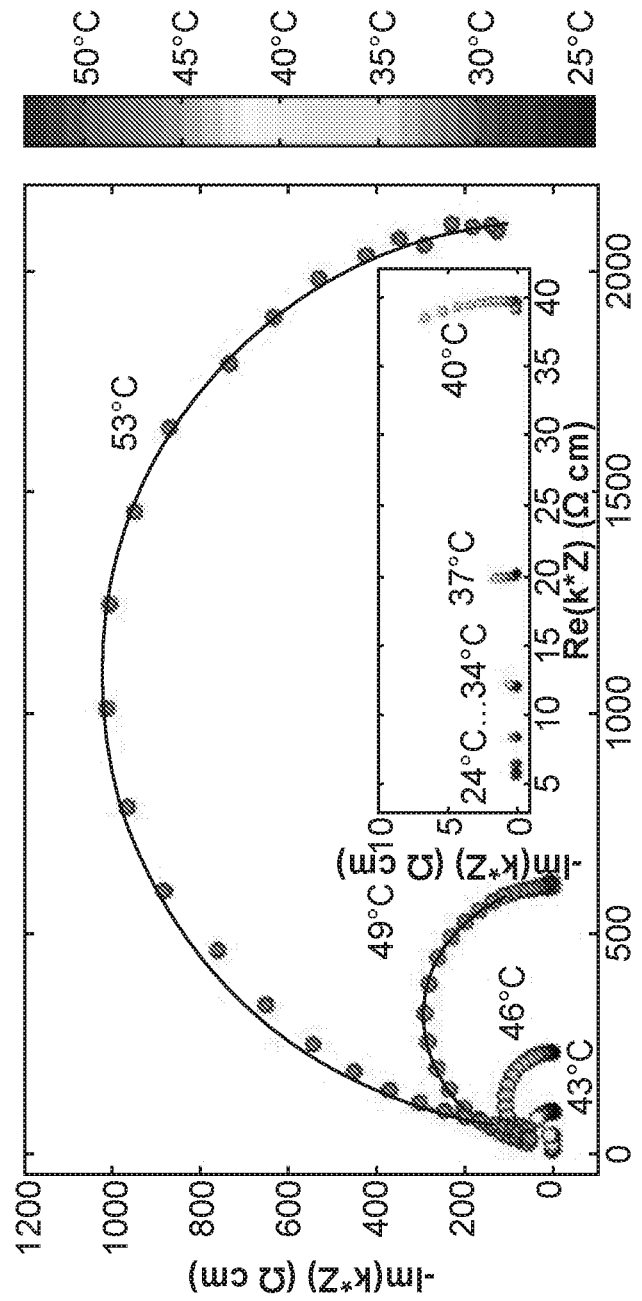
Figure 25C:
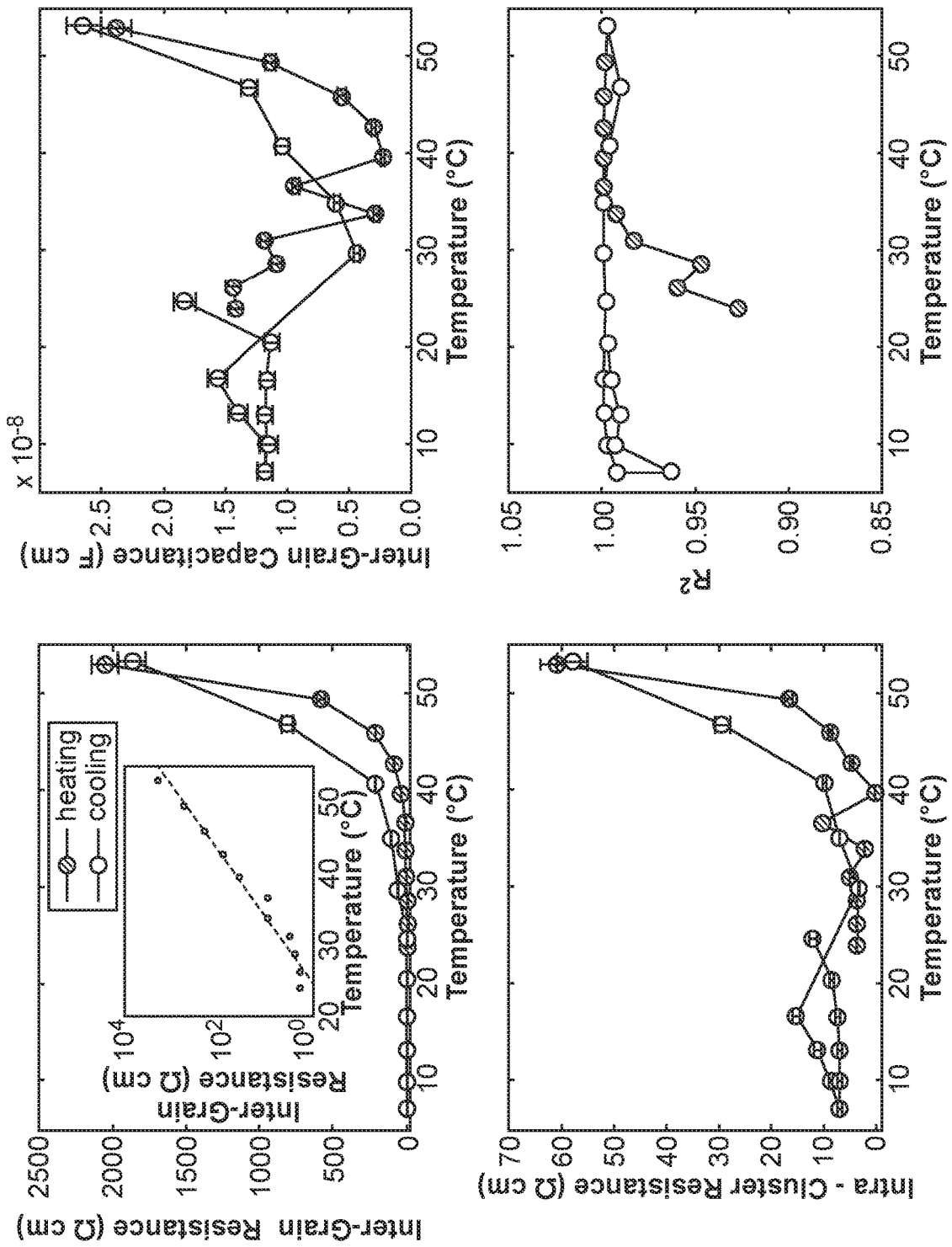

To evaluate the thermoresponsive behavior and evolution of charge transport properties, a Ni/PE nanocomposite system with about 4.30 vol. % of Ni loading was measured by four-probe impedance spectroscopy at moderate temperature and fixing the applied current to I=about 10 µA to prevent self-heating. The measurement setup is shown schematically in FIG. 25A. FIG. 25B shows the Nyquist plot of the measured data reported in closed symbols. Both the real and the imaginary part of the plot have been normalized with the geometrical factor of the sample, thus, giving units of resistivity. In the Nyquist plot, the real part and imaginary part can be correlated to intra-cluster/inter-grain resistance and inter-grain capacitance, respectively. As seen in the inset of FIG. 25B, at room temperature the composite exhibited a low real value corresponding to a resistivity below $\rho$=about 10 $\Omega$cm and negligible contribution from the imaginary part in the Nyquist plot. This indicates that at room temperature, the electrical charge transport can be mainly described by continuous percolation pathways through the composite with mainly an intra-cluster constrained resistivity and negligible contribution from inter-grain resistance and capacitance effects. Upon heating due to thermal expansion of the composite, part of the percolative pathways breaks, inter-grain effects start to appear and become more important, and as a consequence the resistivity of the composite increases gradually. Also, the imaginary part of the plot starts to develop and can be attributed to inter-grain capacitances. The measured temperature dependent impedance data (full symbols in FIG. 25B) have been fitted using the model shown in FIG. 24B and are shown in continuous lines.

Further analysis extracting the fitting parameters of the proposed model for samples with about 4.30 vol. % of loading indicates that the inter-grain resistance remains mostly constant up to temperature of about T=about 30° C., followed by a sharp increase as temperature continues to rise. The inter-grain capacitance values shows a similar behavior, exhibiting mostly constant values up to T=about 30° C., followed first by a slight decrease and after that by a strong increase. Interestingly, the intra-cluster resistance shows little variation up to temperatures of about T=about 40° C. These observations stay in agreement with the assumption that upon heating and related thermal expansion of the composite, the percolation pathways are gradually broken resulting in an increase of the inter-grain resistance. Similarly, the inter-grain capacitance values are affected by the thermal expansion. The intra-cluster resistance values, which are constrained by charge transport inside Ni particle clusters, on the other hand, start to increase at higher temperatures where part of the clusters starts to break apart. An important parameter in the proposed model is the inter-grain resistance, which follows an exponential temperature dependence in a tunneling region ($R_{inter-grain}$=A×exp(B×T), with A=about 0.0024 and B=about 0.248, see inset of FIG. 25C). These observations stay in agreement with the assumption that the percolation system at room temperature transitions towards a tunneling region at elevated temperatures due to the thermal expansion of the PE matrix. Upon cooling, all extracted parameters were found to be reversible.

Similar experiments have been carried out for a set of three different compositions with Ni particle loadings of about 2.56 vol. %, about 4.30 vol. % and about 6.54 vol. %. A CB/PE composite with CB loading of about 5.10 vol. % was also measured for comparison. FIG. 26 shows the normalized inter-grain resistance values obtained from the fitting of the temperature dependent Nyquist plots. It can be noted that composites with different types of conductive fillers and/or different volume fractions show different conduction behavior. As temperature increases, the inter-grain resistance increases more significantly when the Ni volume fraction is closer to percolation region. While for similar volume fraction, the CB network does not show dramatic changes in inter-grain resistance values. Similarly, the variation of inter-grain capacitance and intra-cluster resistance values do not show strong variations upon heating (FIG. 29). Typically, it is found that the composite with Ni at about 4.30 vol. % of loading exhibits a resistance increase of more than about 2000 times as temperatures increases from about 24 to about 53° C., while the resistance of CB/PE composite with about 5.10 vol. % of CB increases about 20 times in the same temperature range. This result indicates the more sensitive thermoresponsive behavior of Ni/PE nanocomposites. Therefore, aiming at temperature sensors with high sensitivity close to room temperature, the Ni composites permit the design of composites with tunable thermo-electrical properties and an adaptable temperature sensitivity of the resistance.

For evaluation as QTC-based pressure sensors, samples were also tested under hydrostatic pressure up to values of about P=about 200 mbar. The Ni/PE sample with about 4.30 vol. % of Ni loading was sandwiched between two polyethylene terephthalate (PET) sheets including four copper electrodes for the electrical contacts. Also in this case, a low current I=about 10 μA in a four-wire configuration has been applied to prevent self-heating of the sample. To this structure, a hydrostatic pressure of up to about 2 N/cm$^2$ has been applied, and revealed a decrease of the inter-grain resistance value to about 37.5%, which corresponds to a linear pressure sensitivity of about 0.31%/mbar. Again, the intra-cluster resistance and inter-grain capacitance exhibited moderate changes. After releasing the load, the resistance recovered, revealing a fully reversible change of resistance upon pressure (FIG. 30).

With the aim to further unravel the charge transport phenomena in the thermoresponsive composites, representative samples were mounted into a cryostation and measured using electrical DC conductivity under vacuum in a temperature range of about 50 K<T<about 360 K. Again, a low current of I=about 10 μA in a four-wire configuration has been applied. FIG. 27 shows the normalized electrical DC-conductivity measured for a Ni/PE sample at about 4.30 vol. % of Ni loading. The conductivity value under ambient pressure at room temperature has been found to be of $\sigma_{300}$=about 0.56 S/cm and decreased to a value of about $\sigma_{300}$=about 9 mS/cm when measured under vacuum (about $10^{-7}$ mbar). This behavior can be attributed to the hydrostatic pressure (P=about 1022 mbar) in air, which results in the contraction of the material under ambient conditions, and is released under vacuum. The effect is fully reversible once the sample is exposed to ambient pressure again. In this experiment, identification is made of three different transport regimes which will be addressed in the following.

Interestingly, the resistivity measured at relatively low temperatures ranging from about 50 K<T<about 190 K scales almost linearly with the temperature ($\rho \sim B_0 \times T$), with a positive temperature resistance coefficient (TRC) of $B_0$=about 0.2%/K, exhibiting a metal-like electron transport behavior (see inset in FIG. 27). Moreover, comparing this value with pure Ni which shows a TRC of about 0.62%/K, it is just about 3 times lower. Upon increasing the temperature (about 190 K<T<about 265 K), a transition is observed where the resistivity follows an exponential behavior with temperature ($\rho \sim \exp[B_1 \times T]$ with $B_1$=about 8.6%/K). Since the thermal expansion coefficient of Ni ($\alpha_{Ni}$=about 13 μm/(m K)) is much smaller than the one of PE ($\alpha_{PE}$=about 200 μm/(m K)), the length of percolation pathways can be assumed to increase linearly to a good approximation and correspondingly the inter-grain distance increases as well. This on the other hand indicates that in this second charge transport regime, the electrical resistivity scales exponentially with inter-grain distances, namely T~ξ, thus showing a proportionality between temperature and average tunneling distance ξ. Upon further increasing the temperature (about 265 K<T<about 360 K) the resistivity continues to strongly increase and it is more convenient at this point to look at the conductivity. As shown in FIG. 27, the normalized conductivity in this transport regime can be fitted with a stretched exponential of the form $\sigma \sim A_2 \times \exp[B_2/T]$, with $A_2$=about $5.82 \times 10^{-11}$ S/cm and $B_2$=about 5690 K, respectively. This indicates that the conductivity decreases asymptotically towards a minimum conductivity value $A_2$ of the composite, which is still well above the value of pure PE with $\sigma_{PE}$ of about $10^{-15}$ S/cm. To wrap up the temperature dependent electrical measurements performed on the Ni/PE composites, identification is made of three different charge transport regimes, which are closely related to the chemical and physical nature of the materials: metal and insulator (see FIG. 31). From a metal-like regime closer to the bulk properties of Ni, a transition occurs through a tunneling regime towards a dielectric regime which is closer to the bulk properties of PE, thus providing a material with tunable electrical properties in a greater range than single-component based materials.

Conclusions: Conductive polymer composites based on nano-spiky Ni particles have been investigated by way of both temperature dependent impedance spectroscopy and pressure dependent impedance spectroscopy. At close to percolation region, an in-depth analysis on the charge transport mechanisms of such systems revealed three distinct transport regimes: metal-like-, tunneling- and dielectric-regime. The results showed that quantum tunneling effects play a major role, which afford significant inter-particle resistance change upon slight change (expansion and contraction) of the micro-structured particle network, thus leading to a very large and reversible change of resistivity. Related to that, Ni/PE nanocomposites show highly adaptable electrical properties with tunable temperature sensitivity which makes them desirable for applications in healthcare sensors to monitor physiological functions where small temperature variations are to be detected.

Experimental

Materials Preparation. To form thermoresponsive polymer composites, spiky Ni particles (T123, Vale Canada) or CB powder were thoroughly mixed with PE granular ($M_w$ of about 7700) at different volume ratios under melting condition (T of about 130° C.). The homogenous mixtures were then coated onto a glass substrate and cooled down to room temperature. Free-standing polymer nanocomposite films were obtained by peeling off the coated layer from the glass substrate.

Electrical Measurement. The electrical impedance spectra have been measured using an Agilent E4980A Precision LCR meter (about 20 Hz-about 2 MHz), connected in a 4-wire setup to the samples constraining the current supply to I=about 10 µA to prevent Joule heating (FIG. 28). Samples have been electrically connected to four equally spaces copper contacts and sandwiched between two PET sheets. Under ambient_pressure and temperature ranges from about 5° C.<T<about 60° C. a Peltier-heater has been used while monitoring the temperature with a commercial Pt1000 platinum temperature sensor. Impedance spectra as function of pressure have been carried out by monitoring the applied force with a Mark-10 force gauge, Model BG05 on an active sample area of A=about 1 cm². Also the electrical DC measurements have been carried out in a 4-wire setup with I=about 10 µA of current using a Keithley Source Meter, Model 2635. For low temperature measurements samples have been mounted to a Cryostat from LakeShore, Model CRX-6.5K operated with a Lakeshore Temperature controller, Model 336 operated at a vacuum of P of about $10^{-7}$ mbar. Slow temperature sweeps in the range of about 3 K/min have been carried out to assure thermal stabilization of the mounted samples. Four equally spaced Au contacts of about 100 nm thickness have been thermally evaporated for the low temperature measurements. All remote measurements have been carried out using customized measurement routines and data analysis has been done with MATLAB.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "nanometer range" or "nm range" refers to a range of dimensions from about 1 nm to about 1 µm. The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 µm.

As used herein, the term "micrometer range" or "µm range" refers to a range of dimensions from about 1 µm to about 1 mm. The µm range includes the "lower µm range," which refers to a range of dimensions from about 1 µm to about 10 µm, the "middle µm range," which refers to a range of dimensions from about 10 µm to about 100 µm, and the "upper µm range," which refers to a range of dimensions from about 100 µm to about 1 mm.

As used herein, the term "nanostructure" refers to an object that has at least one dimension in the nm range. A nanostructure can have any of a wide variety of shapes, and can be formed of a wide variety of materials. Examples of nanostructures include nanowires and nanoparticles.

As used herein, the term "nanowire" refers to an elongated nanostructure. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the µm range, and an aspect ratio that is about 5 or greater.

As used herein, the term "nanoparticle" refers to a spherical or spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 5, such as about 1.

As used herein, the term "microstructure" refers to an object that has at least one dimension in the µm range. A microstructure can have any of a wide variety of shapes, and can be formed of a wide variety of materials. Examples of microstructures include microwires and microparticles.

As used herein, the term "microwire" refers to an elongated microstructure. Typically, a microwire has a lateral dimension (e.g., a cross-sectional dimension in the form of a width, a diameter, or a width or diameter that represents an average across orthogonal directions) in the µm range, a longitudinal dimension (e.g., a length) in the µm range, and an aspect ratio that is about 5 or greater.

As used herein, the term "microparticle" refers to a spherical or spheroidal microstructure. Typically, each dimension (e.g., a cross-sectional dimension in the form of a width, a diameter, or a width or diameter that represents an average across orthogonal directions) of a microparticle is in the µm range, and the microparticle has an aspect ratio that is less than about 5, such as about 1.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A polymer composite comprising:
   a polymeric matrix; and
   conductive nanoparticles and/or conductive microparticles dispersed in the polymeric matrix, wherein the polymeric matrix includes a polymer having a thermal expansion coefficient of at least 100 μm/(m K), wherein the conductive nanoparticles and/or conductive microparticles each includes a core, protrusions extending from the core, and a conductive coating at least partially covering the core and the protrusions, and characterized by a switching temperature, such that an electrical conductivity of the polymer composite undergoes a change by a factor of at least $10^3$ across the switching temperature.

2. The polymer composite of claim 1, wherein the thermal expansion coefficient of the polymer is at least 140 μm/(m K).

3. The polymer composite of claim 1, wherein the polymer is selected from polyolefins.

4. The polymer composite of claim 1, wherein the conductive coating includes a carbonaceous material.

5. The polymer composite of claim 1, wherein the conductive coating includes graphene.

6. The polymer composite of claim 1, wherein the conductive coating has a thickness in a range from 0.5 nm to 100 nm.

7. The polymer composite of claim 1, wherein a loading level of the conductive nanoparticles and/or conductive microparticles is in a range from 0.5% to 40% by volume of the polymer composite.

8. The polymer composite of claim 1, wherein the electrical conductivity of the polymer composite undergoes a change by a factor of at least $10^5$ across the switching temperature.

9. A battery electrode structure comprising:
a current collector; and
an electrode disposed adjacent to the current collector and including an electrochemically active material,
wherein the current collector includes a polymer composite comprising:
a polymeric matrix; and
conductive fillers dispersed in the polymeric matrix,
wherein the polymeric matrix includes a polymer having a thermal expansion coefficient of at least 100 μm/(m K),
wherein the conductive fillers have surface texturing, and
characterized by a switching temperature, such that an electrical conductivity of the polymer composite undergoes a change by a factor of at least $10^3$ across the switching temperature.

10. The battery electrode structure of claim 9, wherein the current collector includes a metal layer and a layer of the polymer composite coated over the metal layer.

11. A battery comprising:
an anode structure;
a cathode structure; and
an electrolyte disposed between the anode structure and the cathode structure,
wherein at least one of the anode structure and the cathode structure corresponds to the battery electrode structure of claim 9.

12. A sensor comprising:
a sensor body; and
a pair of electrical contacts electrically connected to the sensor body,
wherein the sensor body includes the polymer composite of claim 1.

13. A battery comprising:
an anode;
a cathode;
optionally a separator disposed between the anode and the cathode;
an electrolyte disposed between the anode and the cathode and optionally on each side of the separator; and
a layer of a polymer composite electrically connected in series with the anode and the cathode, the layer of the polymer composite having a thickness of about 1 μm to about 100 μm, and wherein the polymer composite includes:
a polymeric matrix; and
conductive particulate fillers dispersed in the polymeric matrix,
wherein the polymeric matrix includes a polymer having a thermal expansion coefficient of at least 100 μm/(m K),
wherein the conductive particulate fillers have surface texturing.

14. The battery of claim 13, wherein the polymer is selected from polyolefins, polyethers, and fluoropolymers.

15. The battery of claim 13, wherein the conductive particulate fillers include metal or carbon nanoparticles and/or metal or carbon microparticles each including a core, protrusions extending from the core, and a conductive coating at least partially covering the core and the protrusions.

16. The battery of claim 15, wherein the conductive coating includes graphene.

17. The battery of claim 13, wherein the polymer composite is characterized by a switching temperature, such that an electrical conductivity of the polymer composite undergoes a decrease by a factor of at least $10^3$ across the switching temperature, and the battery is deactivated when an operating temperature of the battery rises across the switching temperature.

18. The polymer composite of claim 1, wherein the polymer is selected from polyethers.

19. The polymer composite of claim 1, wherein the polymer is selected from fluoropolymers.

20. The polymer composite of claim 1, wherein the conductive nanoparticles and/or conductive microparticles comprise metal or carbon nanoparticles.

21. The polymer composite of claim 20, wherein the conductive nanoparticles and/or conductive microparticles contain Ni or carbon.

22. The polymer composite of claim 1, wherein the core and protrusions are conductive.

* * * * *